United States Patent
Ahuja et al.

(10) Patent No.: US 10,944,723 B2
(45) Date of Patent: Mar. 9, 2021

(54) SYSTEMS AND METHODS FOR MANAGING ENDPOINTS AND SECURITY POLICIES IN A NETWORKED ENVIRONMENT

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US); Jitendra Gaitonde, Cupertino, CA (US); John Parker, San Jose, CA (US); Manoj Ahluwalia, San Jose, CA (US); Damodar Hegde, Cupertino, CA (US); Neil Liberman, Santa Clara, CA (US); Rajiv Sreedhar, Sunnyvale, CA (US)

(73) Assignee: SHIELDX NETWORKS, INC., San Jose, CA (US)

( * ) Notice: Subject to any disclaimer, the term of this patent is extended or adjusted under 35 U.S.C. 154(b) by 338 days.

(21) Appl. No.: 15/816,388

(22) Filed: Nov. 17, 2017

(65) Prior Publication Data

US 2019/0158465 A1 May 23, 2019

(51) Int. Cl.
*H04L 29/06* (2006.01)
*H04L 29/08* (2006.01)

(52) U.S. Cl.
CPC ........ *H04L 63/0263* (2013.01); *H04L 63/101* (2013.01); *H04L 63/20* (2013.01); *H04L 67/10* (2013.01); *H04L 69/16* (2013.01)

(58) Field of Classification Search
CPC . H04L 63/20; H04L 41/0893; H04L 41/0803; H04L 41/12; H04L 45/46; H04L 41/084
See application file for complete search history.

(56) References Cited

U.S. PATENT DOCUMENTS

| 7,373,660 B1 * | 5/2008 | Guichard | H04L 47/10 726/15 |
| 8,762,298 B1 * | 6/2014 | Ranjan | H04L 63/14 706/12 |

(Continued)

OTHER PUBLICATIONS

Wang, R., Enck, W., Reeves, D., Zhang, X., Ning, P., Xu, D., Zhou, W. and Azab, A.M., 2015. EASEAndroid: automatic policy analysis and refinement for security enhanced android via large-scale semi-supervised learning. In 24th {USENIX} Security Symposium ({USENIX} Security 15) (pp. 351-366). (Year: 2015).*

(Continued)

*Primary Examiner* — James R Turchen
(74) *Attorney, Agent, or Firm* — Nicholson De Vos Webster & Elliott LLP

(57) ABSTRACT

Systems, methods, and apparatuses enable deploying and executing a security policy on endpoints in a network. In an embodiment, a security orchestrator determines a set of endpoints in a network and determines transformed endpoints from the determined set of endpoints through an endpoint transformation process. The security orchestrator determines a connectivity vector for at least a first transformed endpoint and a second transformed endpoint, where the connectivity vector includes properties associated with the corresponding transformed endpoint. Using the properties from the connectivity vector of the first transformed endpoint, a security policy is generated and deployed to the first transformed endpoint. Based on a comparison of the connectivity vectors of the first and second transformed endpoints indicating a similarity between the first and second transformed endpoints, the security policy is further deployed to the second transformed endpoint.

18 Claims, 17 Drawing Sheets

(56) References Cited

U.S. PATENT DOCUMENTS

| | | | | |
|---|---|---|---|---|
| 8,813,236 | B1* | 8/2014 | Saha | H04L 63/1408 726/25 |
| 9,027,077 | B1* | 5/2015 | Bharali | G06F 16/00 726/1 |
| 9,444,829 | B1* | 9/2016 | Ashley | G06F 16/90 |
| 2007/0136788 | A1* | 6/2007 | Monahan | H04L 63/20 726/3 |
| 2010/0005505 | A1* | 1/2010 | Gottimukkala | H04L 63/20 726/1 |
| 2011/0138441 | A1* | 6/2011 | Neystadt | H04L 63/10 726/1 |
| 2014/0156814 | A1* | 6/2014 | Barabash | H04L 41/0803 709/220 |
| 2014/0214914 | A1* | 7/2014 | Alex | G06F 9/5033 709/201 |
| 2014/0280152 | A1* | 9/2014 | Jin | G06F 16/285 707/737 |
| 2014/0280946 | A1* | 9/2014 | Mukherjee | H04L 41/084 709/226 |
| 2015/0256413 | A1* | 9/2015 | Du | H04L 41/12 370/216 |
| 2016/0034269 | A1* | 2/2016 | Furuichi | G06F 8/65 717/169 |
| 2016/0062754 | A1* | 3/2016 | Tripp | G06F 8/60 717/120 |
| 2016/0112270 | A1* | 4/2016 | Danait | H04L 41/142 709/220 |
| 2016/0344772 | A1* | 11/2016 | Monahan | G06F 21/577 |
| 2016/0359680 | A1* | 12/2016 | Parandehgheibi | G06F 16/17 |
| 2016/0359740 | A1* | 12/2016 | Parandehgheibi | G06F 16/285 |
| 2016/0359915 | A1* | 12/2016 | Gupta | H04L 63/20 |
| 2017/0126834 | A1* | 5/2017 | Fransen | H04L 67/303 |
| 2017/0207980 | A1* | 7/2017 | Hudis | H04L 41/145 |
| 2017/0237778 | A1* | 8/2017 | DiGiambattista | G06N 20/00 726/1 |
| 2017/0272442 | A1 | 9/2017 | Klimovs et al. | |
| 2017/0324765 | A1* | 11/2017 | McLaughlin | H04L 63/1441 |
| 2017/0339178 | A1* | 11/2017 | Mahaffey | H04L 67/16 |
| 2018/0027006 | A1* | 1/2018 | Zimmermann | G06F 9/46 726/11 |
| 2018/0069899 | A1* | 3/2018 | Lang | G06F 8/38 |
| 2018/0103052 | A1* | 4/2018 | Choudhury | G06F 16/9024 |
| 2018/0247188 | A1* | 8/2018 | Wong | G06F 40/30 |
| 2018/0278496 | A1* | 9/2018 | Kulshreshtha | H04L 41/145 |
| 2018/0287907 | A1* | 10/2018 | Kulshreshtha | H04L 43/04 |
| 2018/0373462 | A1* | 12/2018 | Childress | G06F 3/0604 |
| 2019/0036950 | A1* | 1/2019 | Isola | H04L 63/1425 |

OTHER PUBLICATIONS

International Search Report and Written Opinion for PCT/US2018/061586, dated Jan. 25, 2019, 13 pages.

* cited by examiner

SYSTEMS AND METHODS FOR MANAGING ENDPOINTS AND SECURITY POLICIES IN A NETWORKED ENVIRONMENT

TECHNICAL FIELD

Embodiments described herein generally relate to network security. In particular, embodiments described herein generally relate to systems and methods for generating and deploying security policies for endpoints in a network environment.

BACKGROUND INFORMATION

A majority of businesses and other organizations rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc.

Networks have numerous endpoints (e.g., the sources and destinations of network traffic), including user devices, firewalls, edge gateways, application servers, databases, etc. Each of these endpoints handle network traffic and are susceptible to attacks. One existing method of handling security for networks with a multitude of endpoints is to deploy a security policy, such as access control lists (ACLS). Existing solutions for generating such security policies involve monitoring network traffic between various endpoints during a specified sampling period. Patterns of network traffic that are detected traveling to and from a particular endpoint can be placed into a whitelist for the particular endpoint, while any other patterns are effectively considered as being in a blacklist for the particular endpoint.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
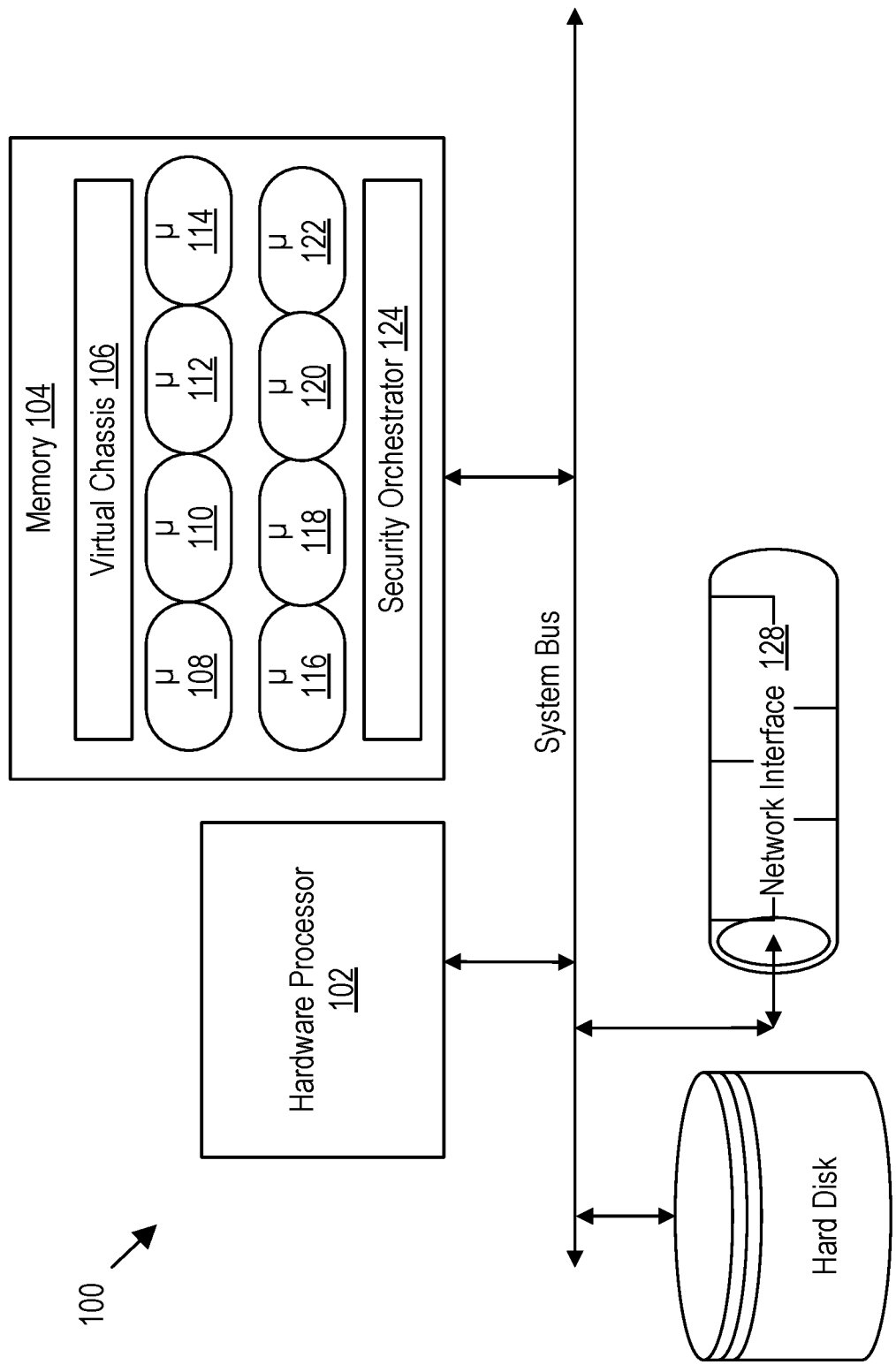
FIG. 1 is a block diagram illustrating computer hardware, including a memory and processor, in accordance with the disclosed embodiments.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Deficiencies of existing security solutions become apparent as the number of endpoints increases. Each endpoint will have a security policy for each endpoint pair it is part of, e.g., as a source or destination of network traffic, because network traffic may differ for each endpoint. In order to develop a security policy for each endpoint and/or endpoint pair, entities or organization must manually determine connections between endpoints and manually generate and apply rules. However, as the number of endpoints increases, the number of possible connections between endpoints and the number of rules rapidly and significantly increase. For example, networks with hundreds or thousands of endpoints will require manually generating massive number of rules. Thus, this deficiency of existing solutions result in a significant amount of processing and storage resources being utilized to generate and maintain the security policies for networks with large numbers of endpoints.

To address the deficiencies of existing security infrastructures, embodiments detailed herein reduce the amount of security policies (e.g., access control lists) to be implemented for network endpoints by reducing the number of network endpoints using an endpoint transformation process, and further determine similarity metrics between the transformed network endpoints.

For example, some embodiments detailed herein determine a set of endpoints in a network by monitoring network activity. A set of transformed endpoints are determined based performing an endpoint transformation process on the determined set of endpoints. In some embodiments, transformed endpoints are created from combining multiple endpoints into a single transformed endpoint, splitting an endpoint into multiple transformed endpoints, removing an endpoint, and other methods of refining the initially determined endpoints based on network, protocol or identity information. The resulting transformed endpoints may be analyzed and managed more efficiently as a result of the transformation process. In some embodiments, a connectivity vector is determined for at least a first transformed endpoint and a second transformed endpoint from the set of transformed endpoints. In some embodiments, each connectivity vector includes network, protocol, and content properties associated with the corresponding transformed endpoint. Using the properties from the connectivity vector of the first transformed endpoint, a security policy is generated and deployed to the first transformed endpoint. In some embodiments, based on a comparison of the connectivity vectors of the first and second transformed endpoints indicating a similarity between the properties of the connectivity vectors of the first and second transformed endpoints, the security policy is further deployed to the second transformed endpoint. The security policy is then applied to network traffic traversing at least the first and second transformed endpoints.

In one embodiment, transformed endpoints are endpoints that have been processed through the endpoint transformation process. In some embodiments, the transformed endpoints further are configured based on security policies determined to be applicable to the transformed endpoints.

FIG. 1 is a block diagram 100 illustrating computer hardware, including a memory and processor, in accordance with the disclosed embodiments. Network security microservices 108-122 are stored in memory 104 (e.g., volatile memory such as Random Access Memory (RAM) and/or non-volatile memory such as disk) and executed by one or more hardware processors or processor cores 102. Network security microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, a network security system 100 utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices and other applications (e.g., virtual chassis 106, security orchestrator 124, etc.) stored in memory 104. A network interface 128 (e.g., fabric or interconnect that is wired or wireless) provides a means for communicating with a data center. Network security system 100 may inspect traffic, detect threats, perform endpoint transformation processes, generate security policies (e.g., access control lists), and otherwise protects a data center using the microservices 108-122.

Embodiments of a network security system 100 providing the above capabilities are now discussed in more detail. Network security system 100 adds security to, or enhances the security of, a datacenter or other computing environment. In an embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, a network security system 100 utilizes a network interface 128 to explore the datacenter and to discover existing network segments, determine security settings to apply to various network segments, detect available hosts and hardware resources, and determine additional configuration information as needed. In an embodiment, the datacenter itself includes several machines with hypervisors, or physical hardware, and the network security system 100 offers microservices to communicate with and protect one or more of those internal virtual machines or physical hardware. Based on performing datacenter discovery, a network security system 100, in some embodiments, may then offer or suggest available security tools for selection either through a graphical interface or via connections with existing enterprise management software. In one embodiment, once configured, a network security system 100 is deployed "in-line," receiving packets headed for the datacenter, thereby allowing network security system to intercept and block suspicious traffic before it reaches the datacenter. With an understanding of the datacenter, a network security system 100 deploys microservices to inspect traffic throughout the datacenter, and not only at ingress. In some embodiments, a network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which may also be a microservice. In an embodiment, the microservices are small in size, consisting of a relatively small number of instructions. In an embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

Memory 104 also stores security orchestrator 124. Security orchestrator 124 is configured to manage the evaluation of network traffic, determine endpoints within a networked environment, perform endpoint transformation process, and generate and deploy security policies that are executed on the transformed endpoints within the networked environment. In one embodiment, the embodiments disclosed herein are performed by security orchestrator 124. In other embodiments, the embodiments disclosed herein are performed by microservices (e.g., microservices 108-122) based on instructions from security orchestrator 124.

It will be understood by those of ordinary skill in the art that a datacenter typically employs many instances of the hardware represented within network security system 100 such as hardware processor 102 and memory 104. Individual servers may have multiple processors or multiple processing boards each with multiple processors. Processors may have a plurality of processing cores and access a plurality of network interfaces. Security orchestrator 124 comprises program code executing within a processor and may have interfaces (such as configuration or administration user interfaces) that are made available over a network to users. In a virtualized environment, the user may not be aware of the specific processor on which security orchestrator 124 is executing and, in some embodiments, that processor may change based on loading of the virtual environment. Such changes may occur based on administrator requests or automatically based on the virtual environment's control software.

In an embodiment, a network security system 100 receives traffic via network interface 128 to/from a datacenter. In one embodiment, a network security system 100 is placed in-line to inspect traffic, and potentially intercept a threat before it arrives at, or leaves, the datacenter. In other embodiments, a network security system 100 monitors the traffic heading into, or out of, the datacenter, in which case the network security system 100 detects threats and generates alerts, but does not block the data. A hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In an embodiment, microservices 108-122 are implemented using computer-executable instructions loaded from the Internet via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer-readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, a network security system 100 runs on a datacenter computer. In other embodiments, however, a network security system 100 is installed and runs on any one of a wide variety of computing platforms, ranging from low-cost to high-cost, and from low-power to high power. In some embodiments, a network security system 100 runs on a server. In some embodiments, a network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, a network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
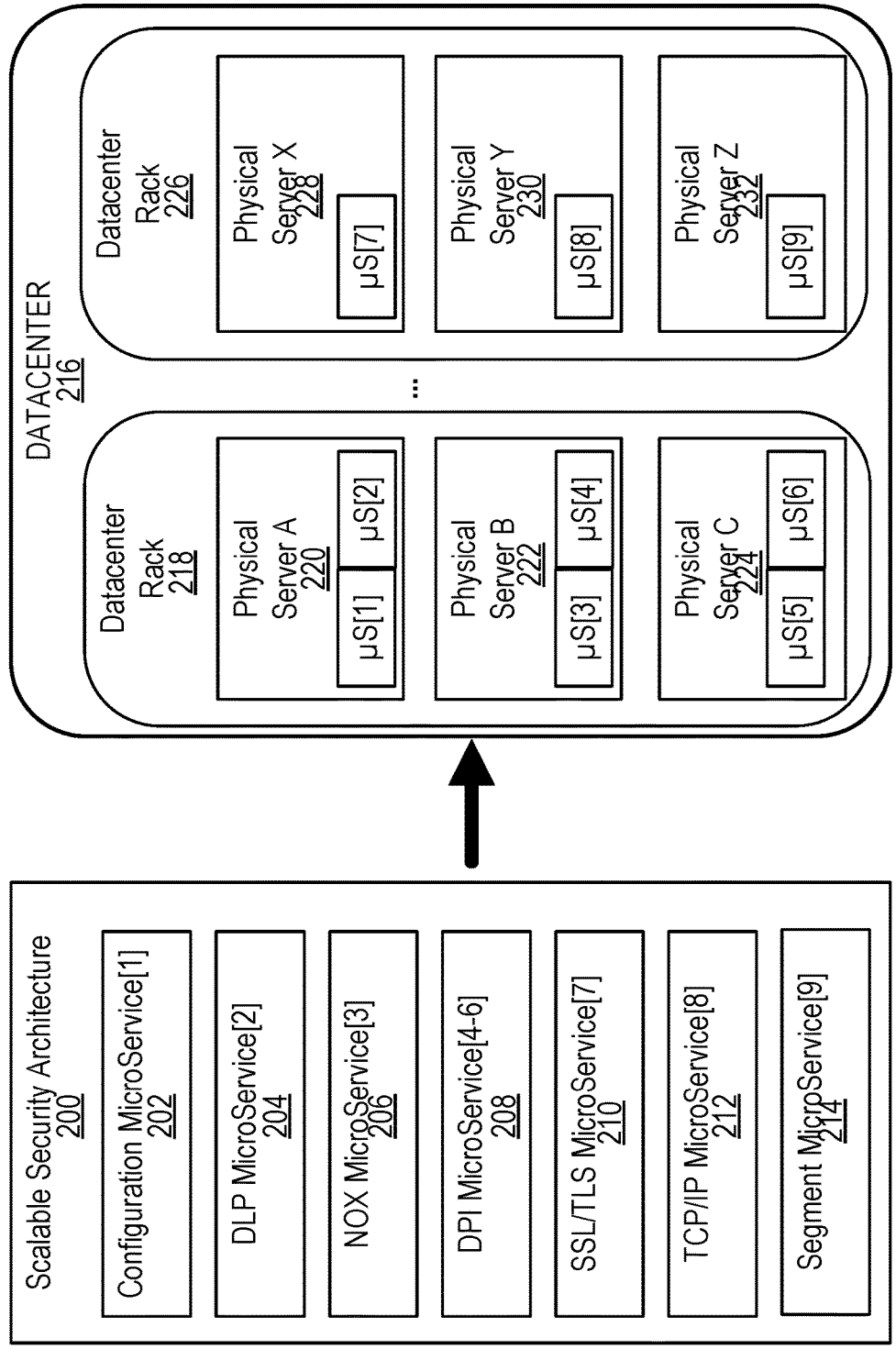
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each level of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3X, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
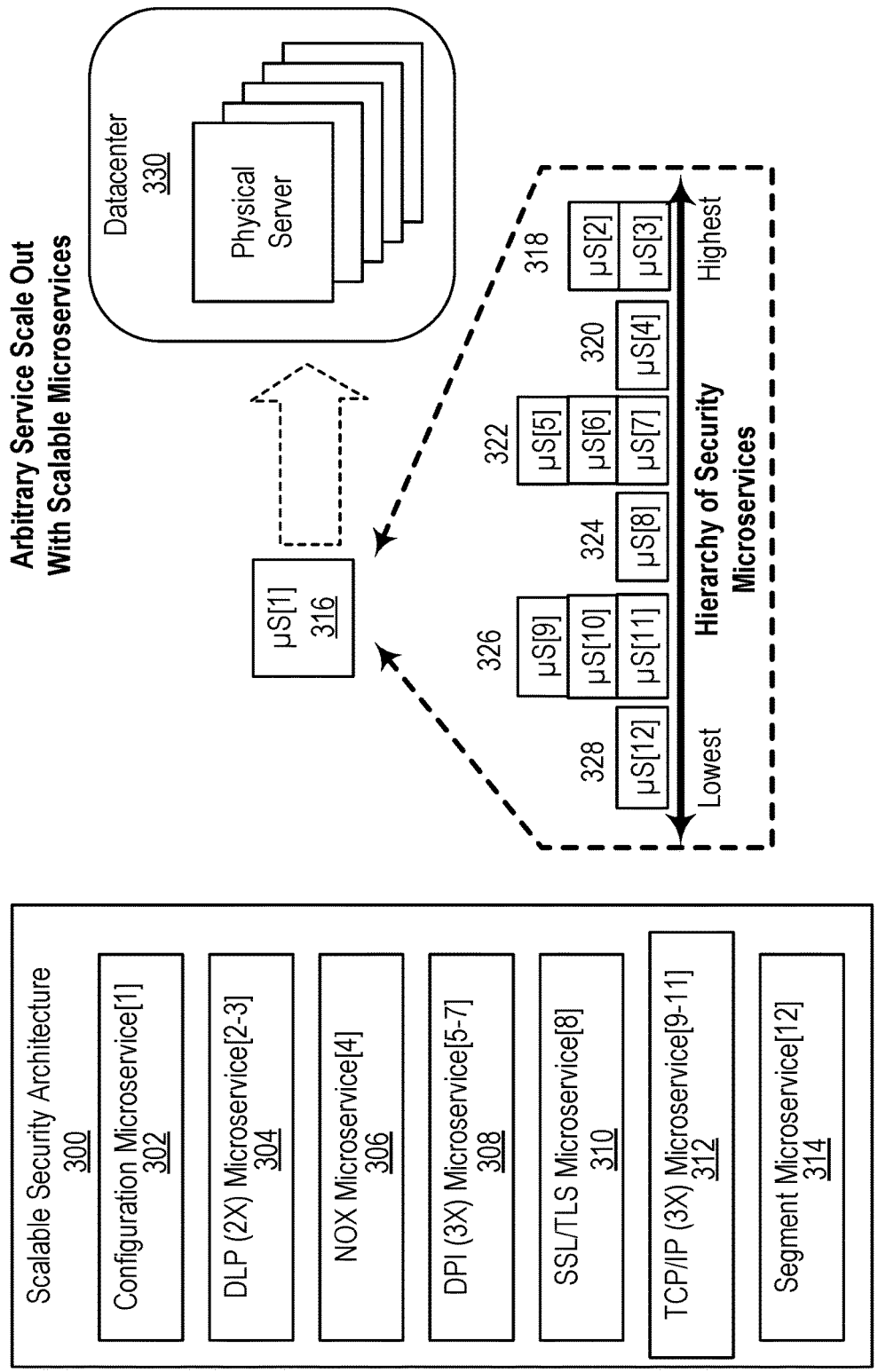
FIG. 3 illustrates an arbitrary scaling out of a microservice in accordance with the disclosed embodiments.

FIG. 3 illustrates an arbitrary scaling out of a microservice according to an embodiment. As shown, scalable security architecture 300 includes configuration microservice 302, DLP (2λ) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy, and configures them to communicate with each other via a backplane. The microservices, for example, may be implemented by physical servers in datacenter 330.

Figure 4:
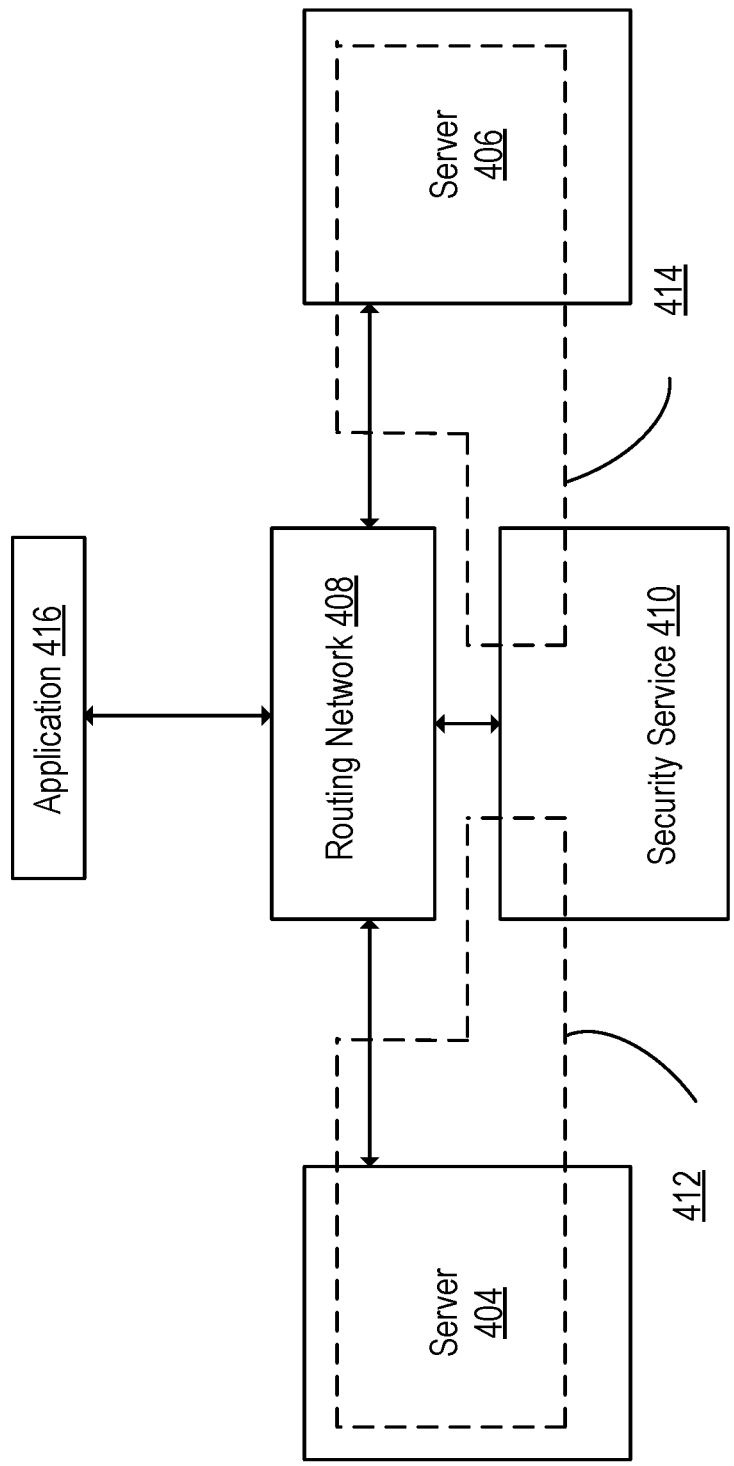
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between an application 416 and one or more servers 404, 406 through a routing network 408. The security service 410 comprises one or more "microservices" used to monitor and perform various actions relative to data items (e.g. network traffic, files, email messages, etc.) sent to and received from one or more applications 416 and servers 404, 406. The microservices comprising security service 410 do not need to be confined to one physical server such as a server 404, 406. For example, one or more microservices of the security service 410 may be executed on server 404 and other microservices of the security service 410 are executed on 406. In some embodiments, the security service 410 is executed on a different server from one or more servers for which the security service is responsible for monitoring and protecting. In one embodiment, servers 404, 406, security service 410, and application 416 is deployed in a networked environment. Examples of networked environments include data centers, an on-premise stack, and a set of servers remotely connected using a network.

In an embodiment, a routing network 408 provides connectivity among servers 404, 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
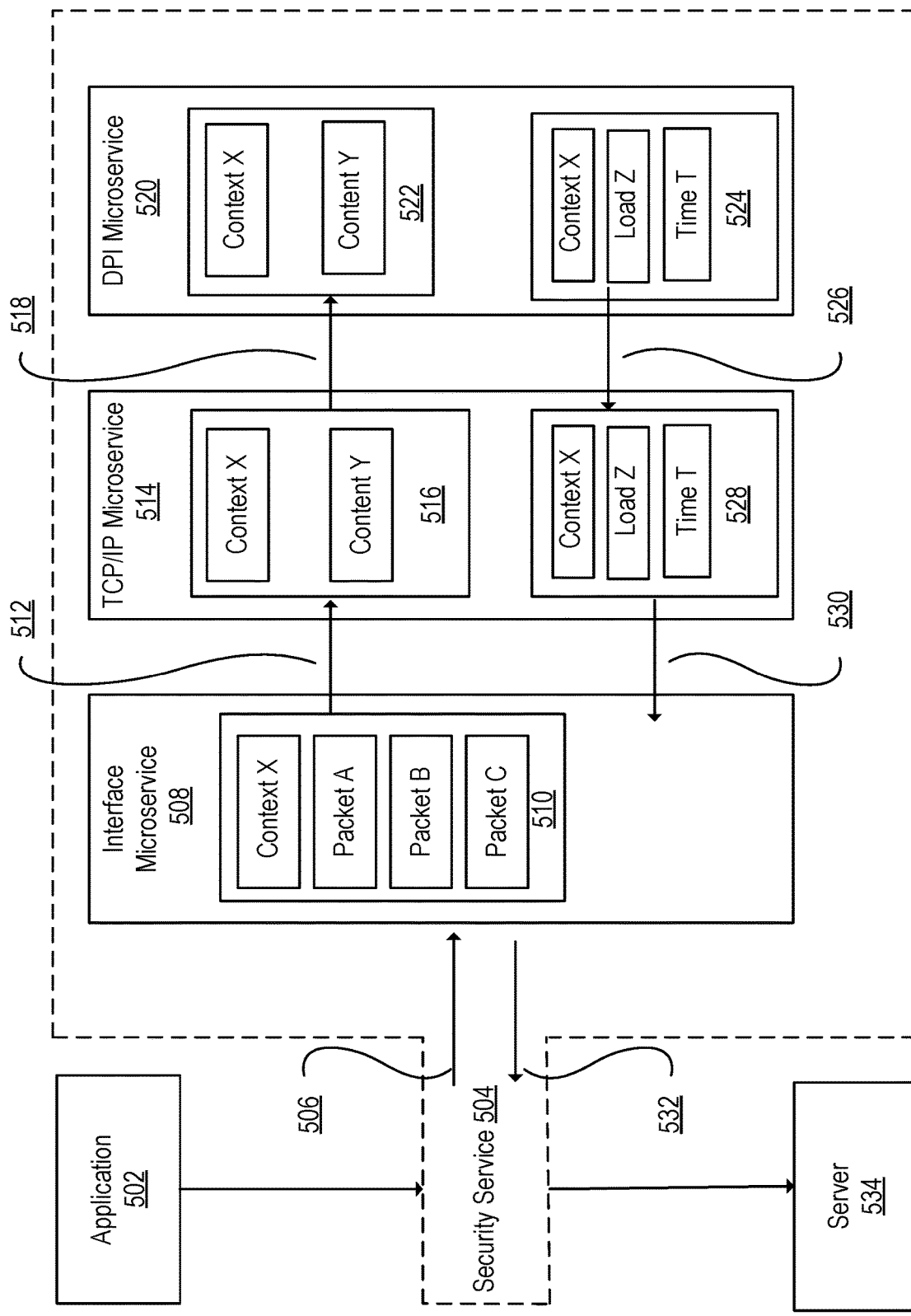
FIG. 5 is a block flow diagram illustrating application data traversing to a server after passing through a hierarchy of security microservices in accordance with the disclosed embodiments.

FIG. 5 is a block flow diagram illustrating application data traversing to a server after passing through a hierarchy of security microservices according to an embodiment. As illustrated, the flow begins with security service 504 receiving a network data packet from application 502. Security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service), or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via paths 526 and 530, the microservices receive and can maintain real-time loading and processing latency information utilized to make load balancing decisions.

Figure 6:
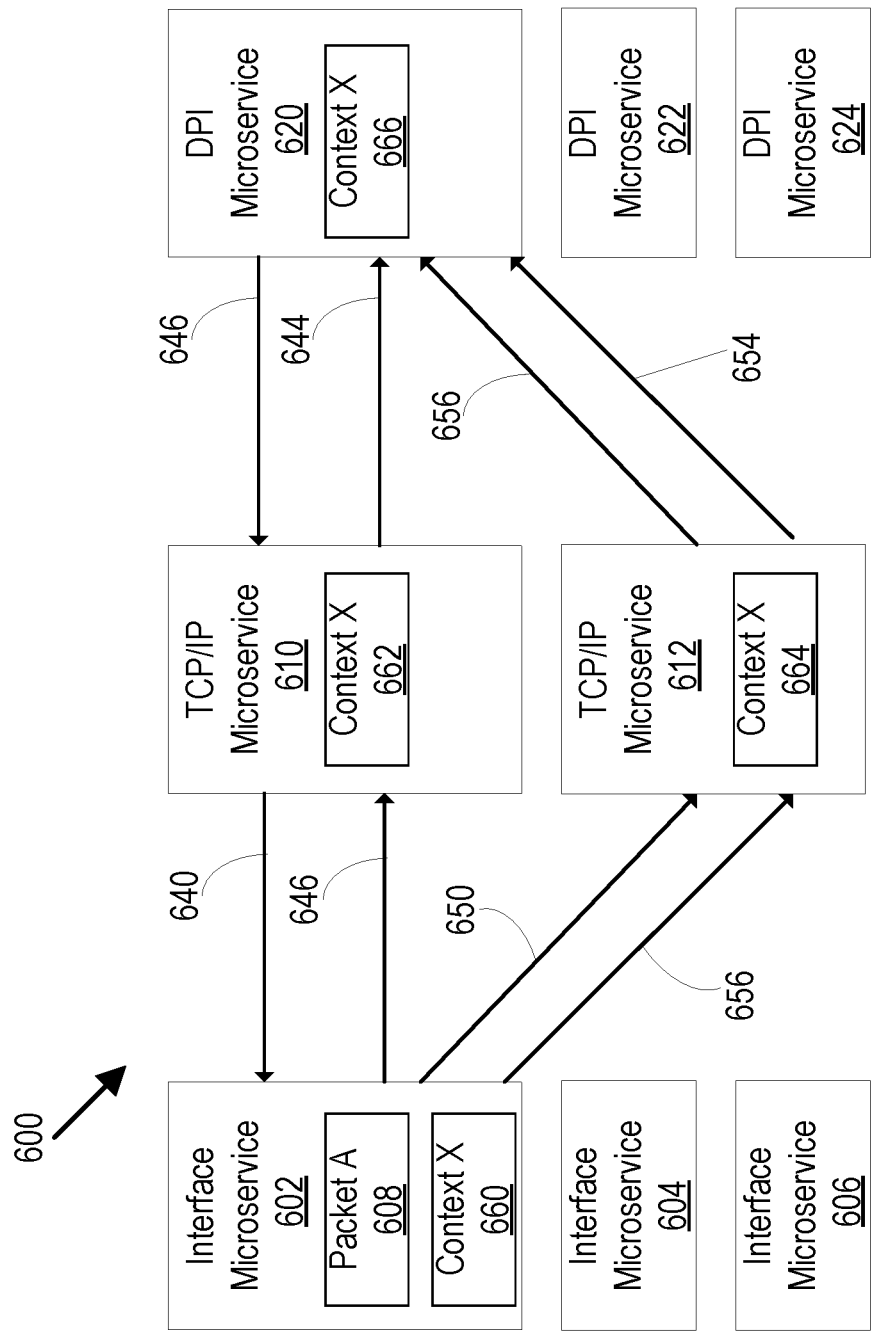
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices, different types microservice types, or both. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission 646. Context X 662, when transmitted to DPI microservice 620 as part of transmission 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, microservices in the same or different hierarchy level of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and also a state lookup or a context lookup, in addition to other information. Interface microservice 602 provides packet A 608 and context X 660 to TCP/IP microservice 610 or 612 via path 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data or the data resulting from the security processing to DPI microservice 620 via paths 644 or 656, respectively. Along with the transmitted data, TCP/IP microservice 610 or 612 forwards context X 662 or 664, respectively, to a DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via path 650. TCP/IP microservice 612 performs some security processing, then transmits the second packet and context X 664 to DPI microservice 620 via path 654. After performing some security processing, DPI microservice 620 responds to TCP/IP microservice 612 via path 654, and TCP/IP microservice responds to interface microservice 602 via path 656.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

Figure 7:
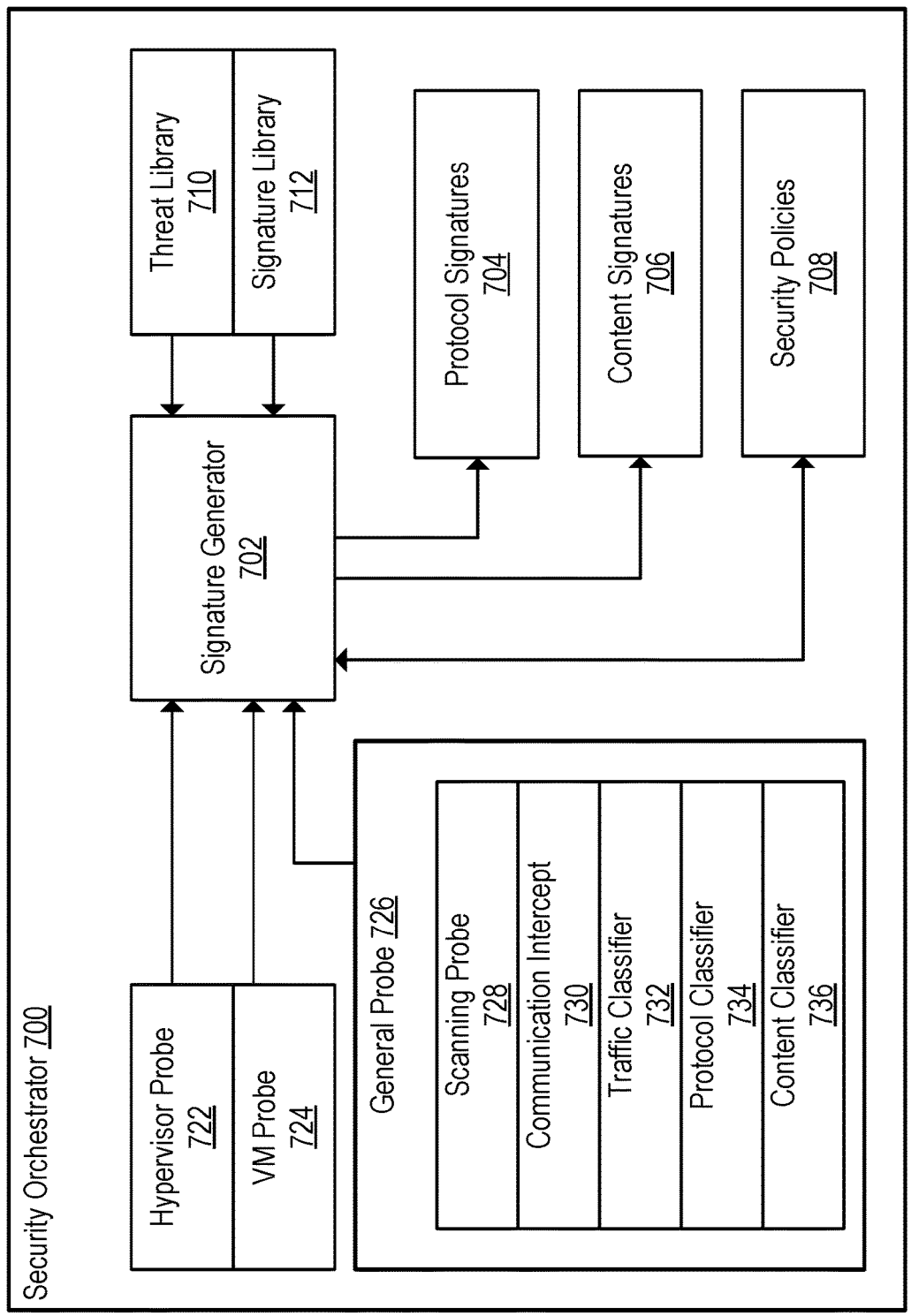
FIG. 7 is a block diagram illustrating a security orchestrator in accordance with the disclosed embodiments.

FIG. 7 illustrates an example system for generating optimized libraries of threat signatures for a computing device based on profile information collected about the computing device, and further generated based on one or more security policies to be applied to the computing device. In one embodiment, security orchestrator 720 is an example of security orchestrator 124, depicted in FIG. 1. In one embodiment, the security orchestrator 700 includes a signature generator 702, which generates an optimized set of protocol signatures 704 and content signatures 706 based on data collected by probes 722, 724, and 726, and further based on security policies 708.

In one embodiment, a threat library 710 and a signature library 712 include an initial comprehensive, or global, set of computer security threat definitions and corresponding computer security threat signatures, respectively. As described above, a security threat definition from a threat library 710 defines one or more rules related to a potential security threat, where each threat definition may be associated with one or more threat signatures of a signature library 712, which can be used to identify instances of the associated security threat. For example, a security threat relating to a known type of phishing attack might be associated with one or more signatures from the signature library 712 identifying email messages, types of network traffic, or other indications of the phishing attack.

In an embodiment, security policies 708 include one or more security policies to be applied to a computing device for which the optimized set of threat signatures is being generated. Security policies 708 may also include access control lists (ACLS) or other information such that security orchestrator 700 may enforce a security policy for a computing device or environment through deployment of the security policies onto that device or environment. Deployment may be achieved through a control mechanism whereby policy elements (such as allowed or blocked network addresses, protocols, etc.) or policy descriptions (referring to policy elements (for example, by name)) are transmitted to enforcing logic within the device or environment.

In one embodiment, a signature generator 702 generates, based on one or more rules of an initial threat library 710 and one or more signatures from signature library 712, an optimized set of protocol signatures 704, content signatures 706, or both. The signature generator 702 generates the optimized set of protocol signatures 704 and content signatures 706 using data collected from probes 722, 724, and 726 (e.g., including data collected by a scanning probe 728, a communication intercept 730, a traffic classifier 732, a protocol classifier 734, and a content classifier 736), and further based on one or more security policies 708 to be applied to the computing device.

Security orchestrator 700 is responsible for deploying security policies to managed endpoints (servers, interfaces, etc.) based on discovering endpoints topology, discovering and classifying the network traffic of those endpoints and utilizing that information to apply security policies to the managed endpoints. In one embodiment, discovery of endpoints is achieved using probes such as hypervisor probe 722, VM probe 724 and general probe 726. General probe 726 may further provide information regarding network traffic from discovered endpoints utilizing scanning probe 728, communication intercept 730, traffic classifier 732, protocol classifier 734 and content classifier 736.

In one embodiment, Security orchestrator 700 utilizes signature generator 702 to select the subset of signatures from signature library 712 to be deployed on monitored endpoints based at least in part on the information provided by general probe 726. Threat library 710 may be used by signature generator 702 to add or remove specific signatures or signature groups from signature library before deploying to monitored endpoints. Monitored endpoints receive signatures in the form of protocol signatures 704 and content signatures 706.

Figure 8:
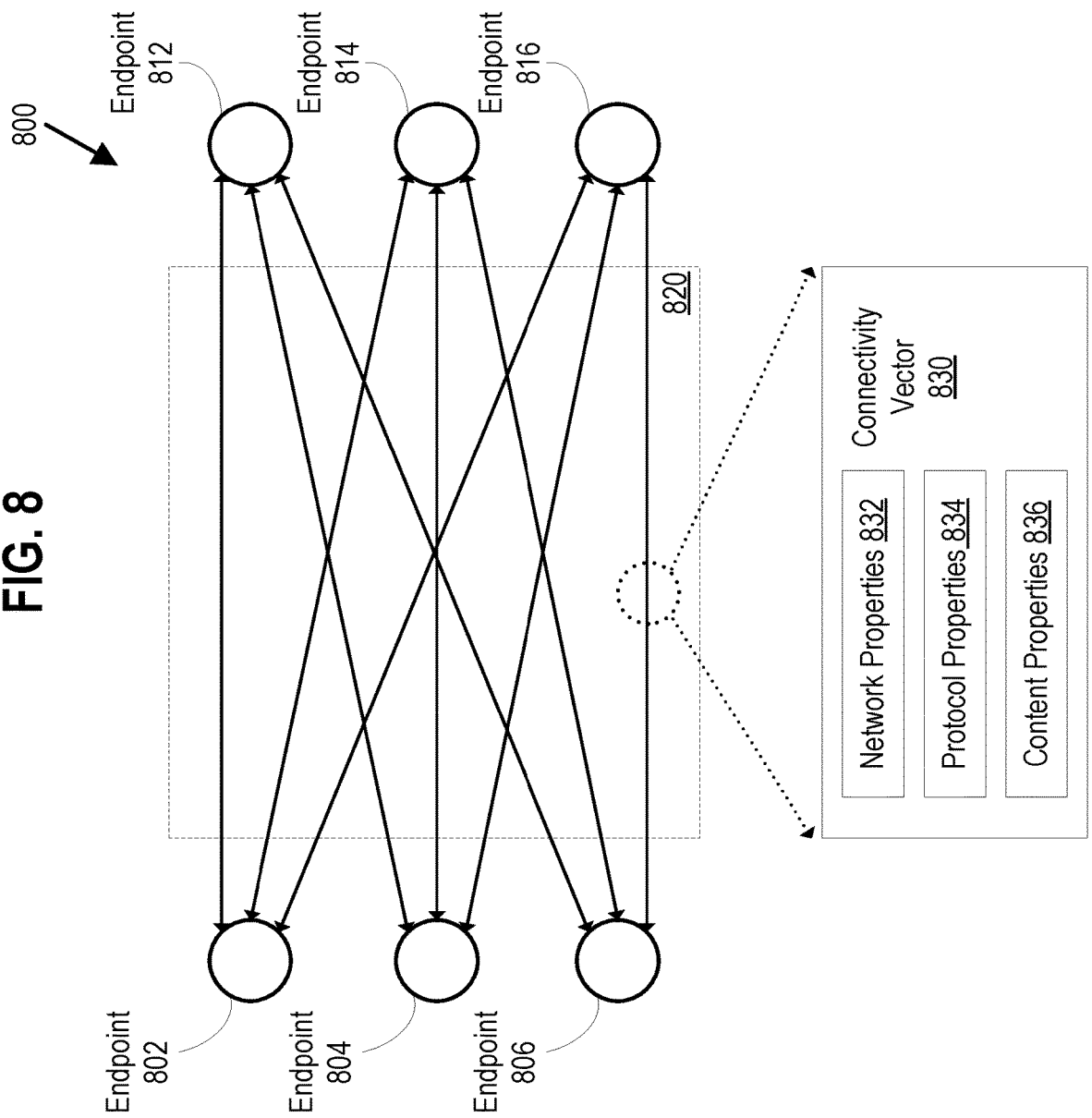
FIG. 8 illustrates an embodiment of connectivity vectors between endpoints in a networked environment in accordance with the disclosed embodiments.

The input to signature generator 702 from hypervisor probe 722, VM probe 724 and general probe 726 allows security orchestrator to maintain a list of all endpoints of a managed network and obtain information regarding the network traffic among those endpoints. FIG. 8 describes this information in more detail and FIG. 9 describes the processing of this information to ultimately generate components of security policy 708.

FIG. 8 illustrates an embodiment of connectivity vectors between endpoints in networked environment 800. Networked environment 800 includes endpoints 802-816. The directional lines connecting pairs of endpoints 802-816 are connectivity vectors. For example, connectively vector 830 refers to the connection between endpoint 806 and endpoint 816. The connectivity vectors connecting pairs of endpoints 802-816 comprise interconnectivity network or connectivity mesh 820, noted by the dashed box. As depicted in FIG. 8, connectivity mesh 820 does not include all possible connectivity vectors between endpoints 802-806, but instead depicts a subset of all possible connectivity vectors. Connectivity vectors may be stored within the memory of security orchestrator 124 or within any memory 104 of the server resources used to execute the functionality of security orchestrator 124. In one embodiment, the memory of security orchestrator 124 is distributed among a plurality of servers, either virtual of physical. In one embodiment, the source of information for a connectivity vector includes the component probes of general probe 726.

A connectivity vector (such as connectivity vector 830) includes, at least, network properties 832, protocol properties 834, and content properties 836. In one embodiment, connectivity vectors are stored in association with security orchestrator 124 in memory 104. Network properties 832 include network-related information, including source and destination IP addresses and source and destination ports. In one embodiment, security orchestrator 124 identifies the network properties from data packets. Protocol properties 832 indicate the protocols that have been identified with the connectivity vector (e.g., SMTP, HTTP, FTP, etc.). Content properties 832 include characteristics of the data (e.g., file types, keywords, data types, etc.). For example, content properties can indicate whether data includes credit card numbers, social security number, etc. In one embodiment, security orchestrator 124 identifies the protocol and content properties from signatures (e.g., protocol classifier 734 and content classifier 736 in FIG. 7). Signatures used to classify protocols and content are in most embodiments distinct from signatures used to identify threads (e.g. protocol signatures 704 and content signatures 706 in FIG. 7) but may be stored in signature library 712 or another library based on design.

In one embodiment, network properties 832, protocol properties 834, and content properties 836 further include direction data. For example, content properties 832 store information indicating that a particular document type (e.g., Microsoft® Word) travels from endpoint 806 to endpoint 816 across connectivity vector 830.

Figure 9:
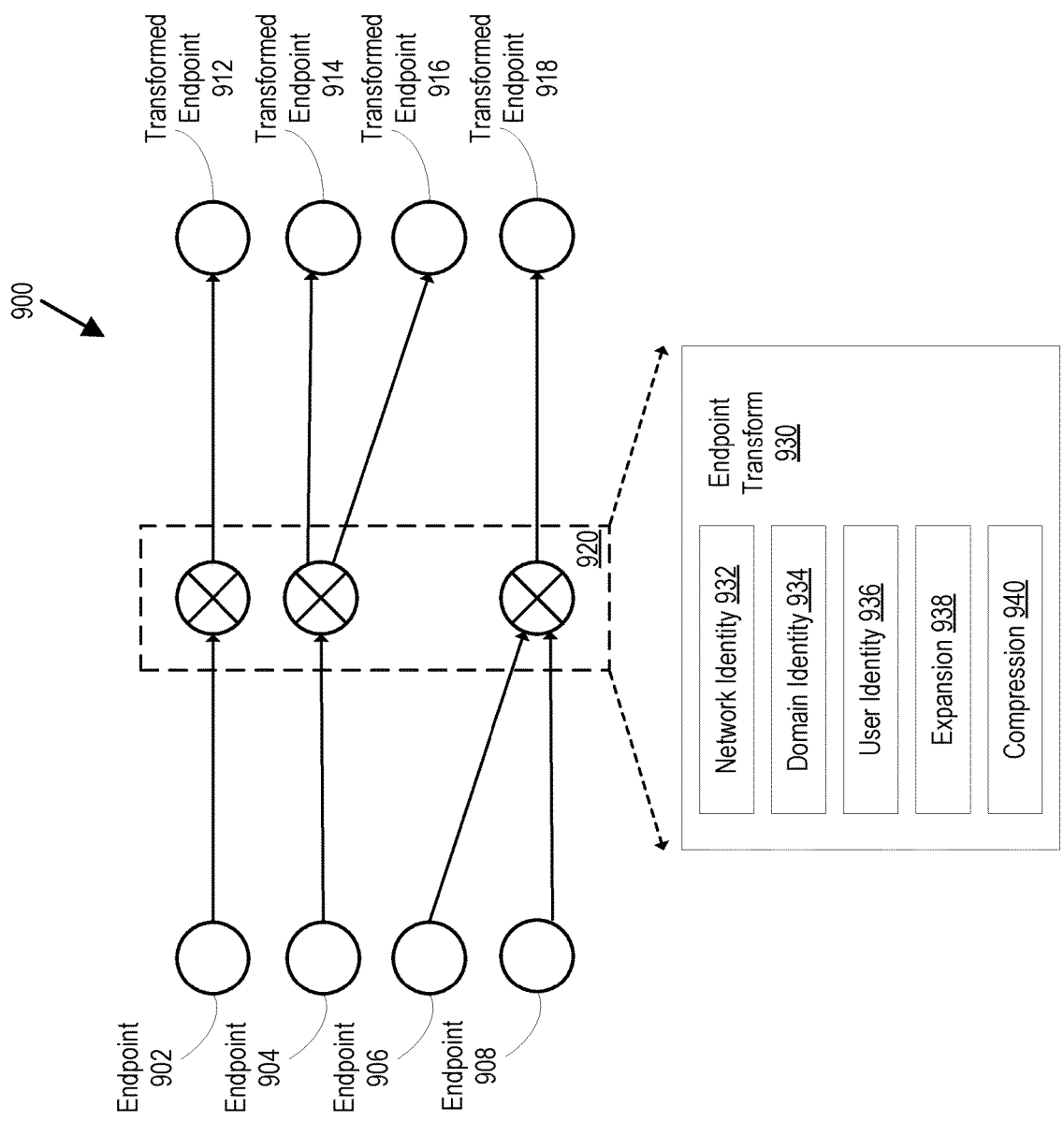
FIG. 9 illustrates an endpoint transformation process on endpoints in a networked environment in accordance with the disclosed embodiments.

FIG. 9 illustrates an endpoint transformation process is performed by the security orchestrator on endpoints in networked environment 900. Networked environment 900 includes endpoints 902-908 and transformed endpoints 912-918. In one embodiment, endpoints 902-908 are processed through endpoint transformation process 920, where endpoint transformation process 920 generates transformed endpoints 912-918. Endpoint transformation process 920 can pass through endpoints, split endpoints, combine endpoints, or remove endpoints. For example, endpoint 902 passes through endpoint transformation process 920 to become transformed endpoint 912. In some embodiments, the pass through transformation is the default operation for endpoints or groups of endpoints that are not transformed using an alternative method.

In another example, endpoint 904 is split into transformed endpoints 914 and 916. In one embodiment, endpoint 904 handles an encapsulated protocol, where a single IP encapsulation includes a plurality of IP addresses. Encapsulated protocols may contain network traffic among a plurality of endpoints while sharing the same IP address. For example, SSL Virtual Private Network (VPN) may be established between two IP addresses but used by many other IP addresses, the identity of which are masked by the encapsulating protocol. As a further example, proxy implementations will often change the IP address of traffic (without encapsulation). In some embodiments, the transformed endpoints are generated through the extraction of an endpoint property within encapsulated network traffic (from the packet headers of encapsulated packets). In some embodiments, the transformed endpoints are generated through extraction of identifying information from within the network traffic data, such as a cookie or other field.

In another example, endpoints 906 and 908 are combined into transformed endpoint 918. In one embodiment, a system that operates a web service in the cloud with a large number users with IP address ranges associated with different service providers, can combine a plurality of IP addresses that are received at multiple endpoints (e.g., endpoints 906 and 908) into a single transformed endpoint (e.g., 918). For example, traffic may originate from many customers from a large internet service provider destined for one of many HTTP web servers. In one embodiment, transformation process 920 (for example, utilizing domain identity 934) combines a number of endpoints from each service provider (individually) to each web server. In another embodiment, transformation process 920 combines a number of endpoints from each service provider (individually) to all the web servers. In another embodiment, transformation process 920 combines a number of endpoints from a plurality of service providers to all web servers.

In a further example, endpoints may be combined within application domains. Transformation process 920 may combine a number of endpoints from web servers wherein all traffic from those endpoints is destined for application servers. The plurality of endpoints of the web servers are reduced to a single endpoint and the plurality of endpoints of the application servers are deduced to a second endpoint. It will be understood by those of ordinary skill in the art that such examples may be applied to the "back end" (application) interfaces of web servers while the "front end" (customer facing) interfaces are separate endpoints which are distinct from the "back end" end points. A server or process within a datacenter may contain multiple interfaces or communicate across multiple domains as configured in a virtual environment.

In one embodiment, endpoint transform 920 includes an ignore option where an endpoint that a user wants the system to ignore is transformed into a null endpoint. Endpoints to be ignored may be specified by IP address, domain, user identity or other property. In one embodiment, endpoints are ignored based on the content traversing the endpoint. In one embodiment, endpoints are ignored if traffic did or did not exist during a specific time period. In such embodiments, transformation process 920 may operate on endpoint information obtained during the specific time period and exclude other time periods.

By performing endpoint transformation process 920 on endpoints in networked environment 900, a more efficient set of transformed endpoints is generated. Endpoint transformation process 920 includes the properties depicted in endpoint transform 930, including, but not limited to network identity 932, domain identity 934, user identity 936, expansion 938, and compression 940. Network identify 932 includes an IP address. Domain identity 934 includes a domain name or information regarding a domain space. User identity 935 defines user identities. Expansion 938 performs the operations to split endpoints into multiple transformed endpoints (e.g., endpoint 904 to transformed endpoints 914 and 916. Compression 940 performs the operations to combine endpoints into a single transformed endpoint (e.g., endpoints 906 and 908 to endpoint 918). Expansion 938 and compression 940 may be considered the operative function performed based on network identity 932, domain identity 934, user identity 936 or other property as described above.

Figure 10:
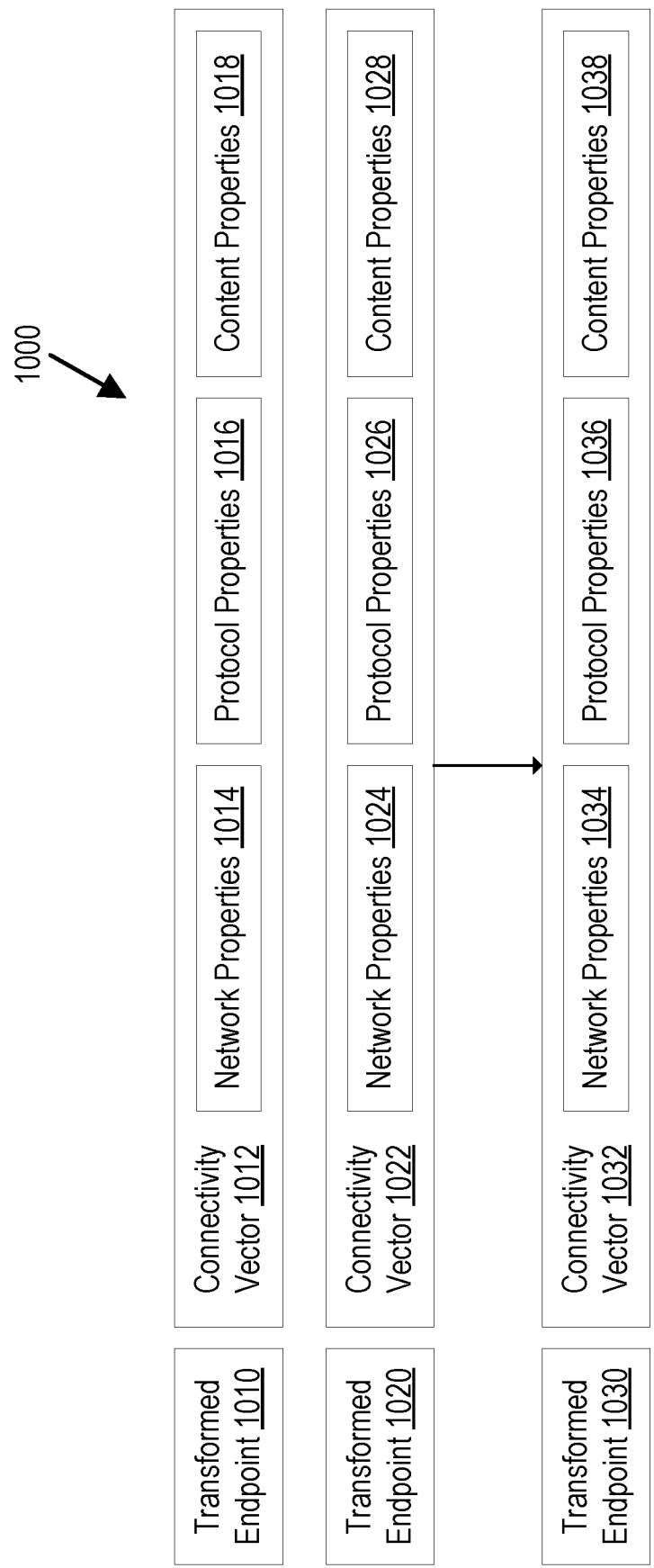
FIG. 10 illustrates a list of transformed endpoints in accordance with the disclosed embodiments.

FIG. 10 illustrates a list of transformed endpoints 1000, including transformed endpoints 1010-1030 according to an embodiment. In one embodiment, the list of transformed endpoints 1000 is stored as part of security orchestrator 124 in memory 104 in FIG. 1. In one embodiment, the list of transformed endpoints 1000 is stored in an appropriate data structure. Each entry in the list of transformed endpoints 1000 includes a connectivity vector (e.g., connectivity vectors 1012-1032).

Connectivity vector 1012 includes network properties 1014, protocol properties 1016, and content properties 1018. Where transformed endpoint 1010 is a compression of two or more endpoints, network properties 1014, protocol properties 1016, and content properties 1018 include a combination of the information from the individual connectivity vectors of the two or more compressed endpoints. Where transformed endpoint 1010 is one of two or more transformed endpoints created by expanding an endpoint, network properties 1014, protocol properties 1016, and content properties 1018 include the information related to the transformed endpoint 1010 split from the information from the original endpoint that relate to the other transformed endpoints generated in the expansion. Similarly, connectivity vector 1022 includes network properties 1024, protocol properties 1026, and content properties 1028, and connectivity vector 1032 includes network properties 1034, protocol properties 1036, and content properties 1038.

Figure 11:
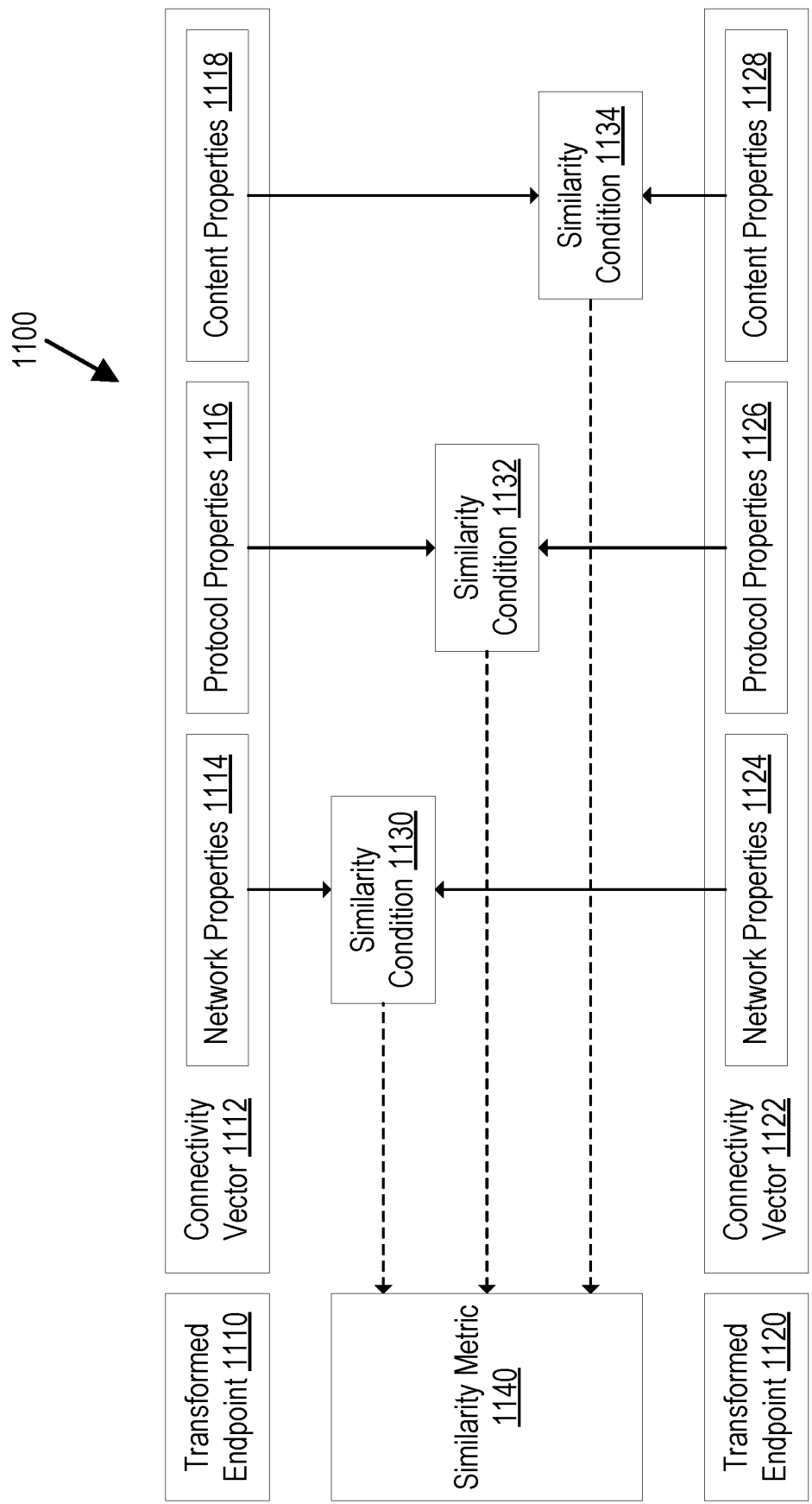
FIG. 11 illustrates a process of generating a similarity metric between two transformed endpoints in accordance with the disclosed embodiments.

FIG. 11 illustrates a process of generating a similarity metric between two transformed endpoints according to an embodiment. In the embodiment depicted in FIG. 11, security orchestrator 124 generates similarity metric 1140 between transformed endpoints 1110 and 1120. In other embodiments, security orchestrator 124 generates similarity metric 1140 between more than two transformed endpoints. Security orchestrator 124 generates similarity metric 1140 by evaluating similarity conditions 1130-1134 between properties of transformed endpoints 1110 and 1120 in connectivity vectors 1112 and 1122, respectively. For example, security orchestrator 124 evaluates similarity condition 1130 between network properties 1114 of transformed endpoint 1110 and network properties 1124 of transformed endpoint 1120. In addition, security orchestrator 124 evaluates similarity condition 1132 between protocol properties 1116 of transformed endpoint 1110 and protocol properties 1126 of transformed endpoint 1120, and evaluates similarity condition 1134 between content properties 1118 of transformed endpoint 1110 and content properties 1128 of transformed endpoint 1120.

In one embodiment, similarity condition 1130 between network properties 1114 of transformed endpoint 1110 and network properties 1124 of transformed endpoint 1120 is based on the first three digits of IP addresses stored by connectivity vectors 1112 and 1122. For example, if the first three digits of an IP address in network properties 1114 match the first three digits of an IP address in network properties 1124, similarity condition 1130 may be considered satisfied.

In one embodiment, similarity condition 1132 between protocol properties 1116 of transformed endpoint 1110 and protocol properties 1126 of transformed endpoint 1120 is based on the protocols associated with each of connectivity vectors 1112 and 1122. For example, security orchestrator 124 determines if there is at least one matching protocol, a defined number or minimum percentage of matching protocols, or if all protocols match between transformed endpoints 1110 and 1120.

In one embodiment, similarity condition 1134 between content properties 1118 of transformed endpoint 1110 and content properties 1128 of transformed endpoint 1120 is based on various information, including, but not limited to, direction of transmission of specified file types, keywords identified in data (e.g., "confidential"), data types being sent (e.g., credit card number, social security number).

In one embodiment, similarity metric 1140 is compared to user-defined or machine-learned metrics. For example, security orchestrator 124 compares similarity metric 1140 against threshold settings that are established by a user, or determined by security orchestrator 124 based on previous data. In one example, similarity metric 1140 indicates transformed endpoints 1110 and 1120 are similar if all similarity conditions 1130-1134 are satisfied. In another example, similarity metric 1140 indicates transformed endpoints 1110 and 1120 are similar if one or two of similarity conditions 1130-1134 are satisfied. In one embodiments, security orchestrator 124 assigns different weights to each of similarity conditions 1130-1134.

For example, security orchestrator 124 may configure similarity metric 1140 to utilize a direct comparison between two transformed endpoints. In this example, similarity conditions 1130, 1132 and 1134 are configured to use equality as a comparison condition and similarity metric 1140 is configured to require the logical AND of the three similarity conditions. As a result, two transformed endpoints are deemed similar only if they have equal network properties, protocol properties and content properties.

In another example, similarity conditions 1130, 1132 and 1134 implement a clustering algorithm such that transformed endpoints within the same cluster are deemed similar by similarity metric 1140. Clustering may be performed on network properties, protocol properties and content properties individually or in combination. Clustering may be user configured (such as by configuring a "granularity" or target number of clusters) or machine configured (such as attempting many target cluster numbers and evaluating the results).

In one embodiment, a property is used to influence the clustering algorithm. For example, the content property "credit cards" or "social security numbers" may be configured to disqualify a clustering solution wherein that property appears in multiple clusters. In one embodiment, a property is used to partition the transformed endpoints and similarity metric 1140 is calculated only between transformed endpoints within the same partition.

Figure 12:
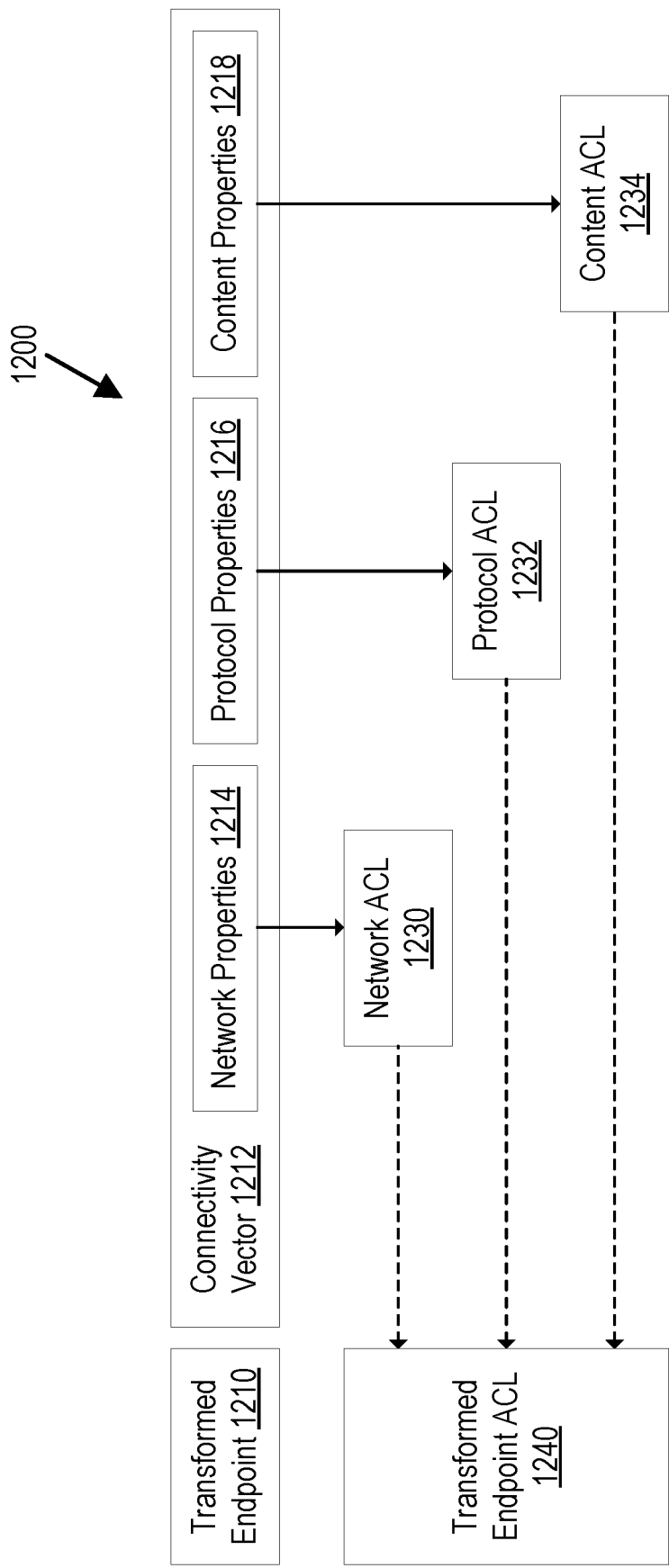
FIG. 12 illustrates a process of generating an access control list (ACL) for each connectivity vector for a transformed endpoint in accordance with the disclosed embodiments.

FIG. 12 illustrates a process of generating an access control list (ACL) for each connectivity vector for a transformed endpoint according to an embodiment. In one embodiment, the ACL is a whitelist/blacklist generated based on properties obtained from a connectivity vector, where the network traffic to and/or from the transformed endpoints on the whitelist is allowed, while all other network traffic is automatically ignored or blocked. In another embodiment, the ACL is a whitelist/graylist, where network traffic on the whitelist is allowed and further evaluation is performed on network traffic on the graylist, rather than automatically ignoring or blocking the traffic.

FIG. 12 illustrates transformed endpoint 1210 with connectivity vector 1212 having network properties 1214, protocol properties 1216, and content properties 1218. In one embodiment, security orchestrator 124 accesses network properties 1214 and determines all the endpoints/transformed endpoints that transformed endpoint 1210 has communicated with and generate a network ACL 1230 (e.g., a whitelist), where all other endpoints are considered blacklisted. Similarly, security orchestrator 124 generates protocol ACL 1232 using protocol properties 1216. For example, protocol ACL 1232 whitelists any protocols that endpoint 1210 has communicated using, while all other protocols are blacklisted.

In one embodiment, security orchestrator 124 generates content ACL 1234 based on content properties 1218. In one embodiment, ingenerating content ACL 1234, security orchestrator 124 identifies the types of data that transformed endpoint 1210 has sent or received. For example, where transformed endpoint 1210 has sent or received credit card information, security orchestrator 124 determines additional network properties and/or protocol properties for implementation.

In one embodiment, network ACL 120, protocol ACL 1232, and content ACL 1234 are combined to create transformed endpoint ACL 1240 for transformed endpoint 1210.

Figure 13:
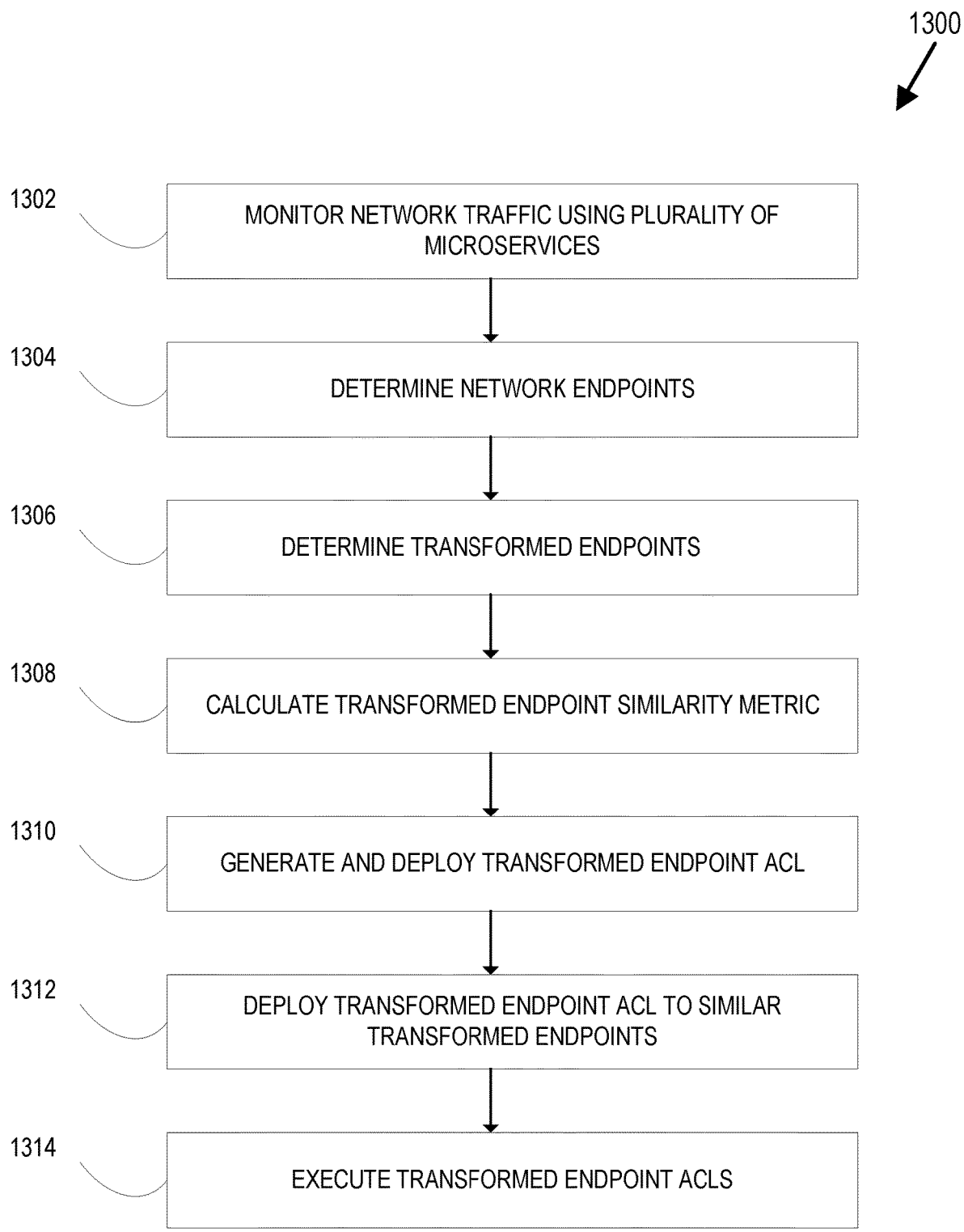
FIG. 13 is a flow diagram illustrating a process for generating and executing transformed endpoint ACLs for transformed endpoints in a networked environment in accordance with the disclosed embodiments.

FIG. 13 is a flow diagram illustrating a process for generating and executing transformed endpoint ACLs for transformed endpoints in a networked environment in accordance with an embodiment. For ease of understanding, the description of FIG. 13 below references components of the networked environment of FIG. 1, however, it is not limited to those components. In one embodiment, the actions below are performed using a security orchestrator (e.g., 124 in FIG. 1). Further, the actions below may be performed by one or more security microservices and/or one or more interface microservices. As such, a single security microservice may perform an action, or two more security services may perform the action either independently, or in conjunction. At block 1302, security orchestrator 124 monitors network traffic through a networked environment. For example, security orchestrator 124 observes and identifies network traffic passing through one or more network endpoints. In other embodiments, network traffic is monitored by a device or system other than security orchestrator 124. In such embodiment, security orchestrator 124 receives the information regarding the observed and identified network traffic from the device or system monitoring the network traffic.

At block 1304, security orchestrator 124 determines the network endpoints within the networked environment. The network endpoints are locations where network traffic is sent or received. In one embodiment, determining the network endpoints includes determining all the endpoint pairs in the networked environment. In one embodiments, the endpoint pairs are identified by monitoring the network traffic and noting each unique endpoint pair that is observed. In one embodiment, security orchestrator 124 determines the network endpoints using IP addresses or similar identifying information, and each endpoint pair can be referred to as IP-IP pairs.

At block 1306, security orchestrator 124 determines transformed endpoints. In one embodiment, security orchestrator 124 determines transformed endpoints by performing an endpoint transformation process. In such embodiments, the endpoint transformation process passes through (e.g., preserves), splits (e.g., expands) and/or combines (e.g., collapses) endpoints to create the set of transformed endpoints. Additional details regarding determining the transformed endpoints within the networked environment are described with respect to FIG. 14.

At block 1308, security orchestrator 124 calculates transformed endpoint similarity metric. In one embodiment, calculating the transformed endpoint similarity metric includes evaluating similarity conditions of network properties, protocol properties, and content properties between two or more transformed endpoints, obtained from the connectivity vector associated with each of the transformed endpoints. In another embodiment, calculating the transformed endpoint similarity metric includes generating a similarity value for an individual endpoint using its own network properties, protocol properties, and content properties. In such embodiments, the similarity value is generated using a list, hash, bitmap or other characterization of network properties, protocol properties, and content properties for a single transformed endpoint. Subsequently, the similarity values for multiple transformed endpoints can be compared to determine the similarity metric.

Figure 15:
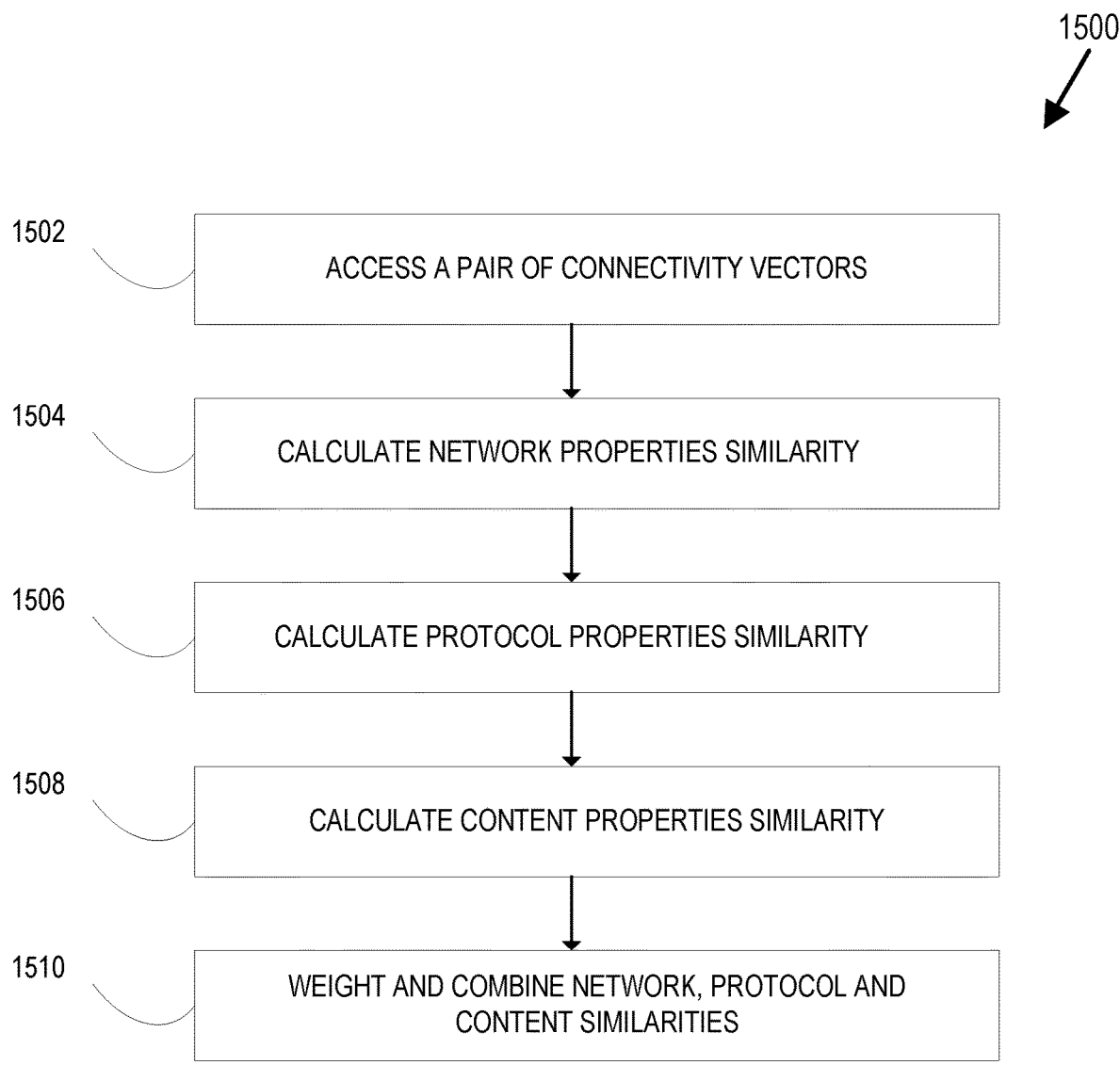
FIG. 15 is a flow diagram illustrating a process for calculating similarity metrics for transformed endpoints within the networked environment in accordance with an embodiment.

Additional details regarding calculating transformed endpoint similarity metrics are described with respect to FIG. 15.

At block 1310, security orchestrator 124 generates and deploys a transformed endpoint ACL (access control list) to at least one transformed endpoint in the networked environment. Additional details regarding generating and deploying transformed endpoint ACLs are described with respect to FIG. 16.

At block 1312, security orchestrator 124 deploys transformed endpoint ACL to similar transformed endpoints. At block 1314, security orchestrator 124 execute the transformed endpoint ACL on network traffic. Transformed endpoints are determined to be similar through evaluation of the similarity metric. In embodiments where the similarity metric is configured to be an equivalence operation, transformed endpoints with equal connectivity vectors are determined to be similar.

In one embodiment, by reducing the number of endpoints by generating transformed endpoints using an endpoints transformation process, the number of overall endpoints is reduced. In addition, by further determining similarity metrics between the generated transformed endpoints, the number of endpoints of ACLs is reduced, as ACLs of one transformed endpoint can be shared with other similar transformed endpoints. In such embodiments, computing resources and storage resources are conserved by avoiding unnecessary processes to generate ACLs for similar transformed endpoints and storing fewer ACLs.

Figure 14:
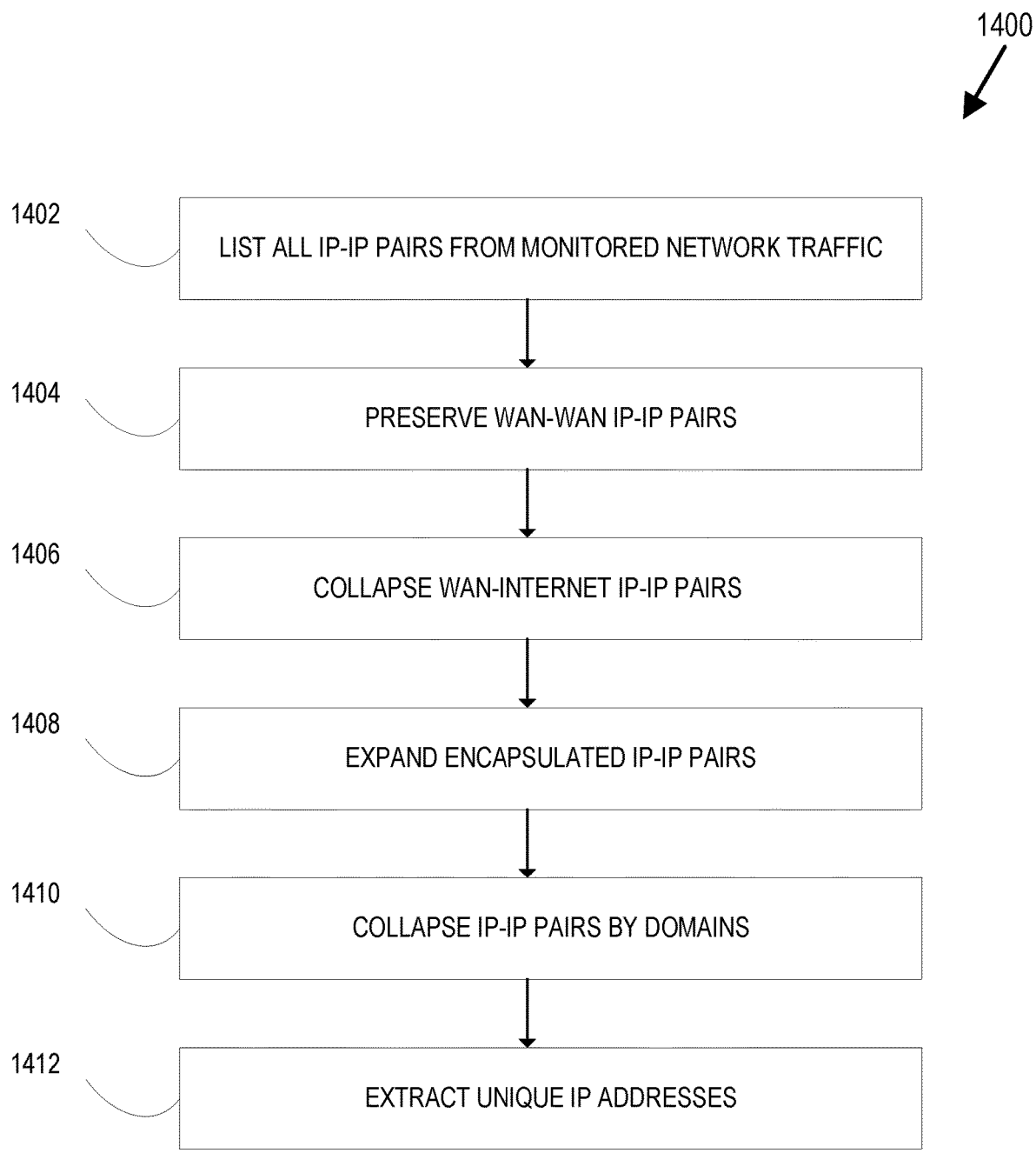
FIG. 14 is a flow diagram illustrating a process for determining the transformed endpoints within the networked environment in accordance with an embodiment.

FIG. 14 is a flow diagram illustrating a process for determining the transformed endpoints within the networked environment in accordance with an embodiment. For ease of understanding, the description of FIG. 14 below references components of the networked environment of FIG. 1, however, it is not limited to those components. In one embodiment, the actions below are performed using a security orchestrator (e.g., 124 in FIG. 1). Further, the actions below may be performed by one or more security microservices and/or one or more interface microservices. As such, a single security microservice may perform an action, or two more security services may perform the action either independently, or in conjunction. At block 1402, security orchestrator 124 accesses a list containing all the IP-IP (e.g., endpoint) pairs determined from the network traffic. In one embodiment, the list is accessed from memory 104.

At block 1404, security orchestrator 124 preserves WAN-WAN IP-IP pairs. In one embodiment, the WAN (wide area network) IP refers to an IP address provided by a service provider. In one embodiment, WAN-WAN refers to internal to internal traffic that has crossed a network boundary. For example, WAN-WAN network traffic can include internal network traffic in a loopback from a firewall back to the firewall. As an example, most internal traffic (inside the security perimeter) is expected to be LAN-LAN traffic. Traffic from outside the security perimeter to the web application customer-facing IP address is expected to be Customer-WAN traffic. Traffic crossing the security perimeter may be Customer-LAN or WAN-LAN traffic depending on configuration. Customer traffic may be identified as traffic from unmanaged IP address ranges outside the public WAN address.

In such an example, internal LAN addresses may be in the form of 10.1.x.x and the external WAN address may be 45.1.2.y. The LAN address range 10.1.x.x would be selected by the administration as the internal address of servers not visible or accessible from the outside except through a VPN. The WAN address range 45.1.2.y would be provided by the hosting entity and the public address for customers of the services provided by the internal servers. This address range would also correspond the publicly available DNS resolution of those services for customers. Addresses on the internet other than 45.1.2.y that are routable would correspond to users from any number of locations and readily identified. Traffic with a source and destination IP in the 45.1.2.y address range is an example of WAN-WAN traffic.

At block 1406, security orchestrator 124 collapses WAN-Internet IP-IP pairs. In one embodiment, security orchestrator 124 collapses WAN-Internet IP-IP pairs by combining two or more WAN-Internet IP-IP pairs into a single WAN-Internet IP-IP pair. In such an embodiment, the selection of the Internet IP address is arbitrary and may be a reserved identifier or symbol indicating "Internet" for the remainder of the analysis. In one embodiment, WAN-Internet IP-IP pairs refer to network traffic between a WAN IP and another user from outside the WAN (e.g., a different service provider). In one embodiment, security orchestrator 124 collapses WAN-Internet IP-IP pairs because the WAN IP that is being accessed by external Internet IPs is an exposed service. For example, assuming three WAN IP addressed web servers being accessed by a plurality of external Internet IPs, collapsing the WAN-Internet IP-IP pairs can result in three WAN-Internet IP-IP pairs rather than a WAN-Internet IP-IP pair for each distinct web server and each distinct external user (e.g., external Internet IP) accessing one of the web servers.

At block 1408, security orchestrator 124 expands encapsulated IP-IP pairs. In one embodiment, security orchestrator 124 expands encapsulated IP-IP pairs by splitting an encapsulated IP-IP pair into two or more separate IP-IP pairs. In one embodiment, encapsulation protocols are used for network traffic between services and the servers that manage the services. In other embodiments, encapsulation protocols are used for network traffic between servers. In such embodiments, security orchestrator 124 expands an encapsulated IP-IP pair to access the individual IP-IP pairs.

At block 1410, security orchestrator 124 collapses IP-IP endpoint pairs by domain. In one embodiment, where a set of endpoints are within the same domain, security orchestrator 124 can collapse the IP addresses associated with the domain into a single IP-IP endpoint pair. For example, assuming a system includes ten web servers and 20 application servers, this system would include 200 IP-IP endpoint pairs. In this example, if all the web servers are on the same web server domain, and all the application servers are on the same application server domain, security orchestrator 124 can collapse the 200 IP-IP endpoint pairs into a single IP-IP endpoint pair. Examples are described previously with respect to FIG. 9.

At block 1412, security orchestrator 124 generates a list of IP endpoints. In one embodiment, security orchestrator 124 extracts unique IP addresses from the list of IP-IP endpoint pairs. In such embodiments, using the network properties, security orchestrator 124 identifies the type of traffic expected to be sent from or received by each unique IP address.

FIG. 15 is a flow diagram illustrating a process for calculating similarity metrics for transformed endpoints within the networked environment in accordance with an embodiment. For ease of understanding, the description of FIG. 15 below references components of the networked environment of FIG. 1, however, it is not limited to those components. In one embodiment, the actions below are performed using a security orchestrator (e.g., 124 in FIG. 1). Further, the actions below may be performed by one or more security microservices and/or one or more interface microservices. As such, a single security microservice may perform an action, or two more security services may perform the action either independently, or in conjunction. At block 1502, security orchestrator 124 accesses a pair of connectivity vectors, including the network properties, protocol properties, and content properties associated with each connectivity vector.

At blocks 1504-1508, security orchestrator 124 calculates the similarity between properties of the pair of connectivity vectors. In calculating the similarity between the pair of connectivity vectors, in one embodiment, security orchestrator 124 makes a binary determination, e.g., the properties of the pair of connectivity vectors do match or do not match. In other embodiments, security orchestrator 124 makes the similarity determination based on a defined amount or percentage of similarity.

At block 1504, security orchestrator 124 calculates network properties similarity between the pair of connectivity vectors. For example, security orchestrator 124 compares the IP addresses of the pair of connectivity vectors. At block 1506, security orchestrator 124 calculates protocol properties similarity between the pair of connectivity vectors. For example, security orchestrator 124 compares the protocol types or number of protocol utilized by each of the pair of connectivity vectors. At block 1508, security orchestrator 124 calculates content properties similarity between the pair of connectivity vectors. For example, security orchestrator 124 compares the direction of data and the types of data sent in the network traffic for each of connectivity vectors.

At block 1510, security orchestrator 124 weights and combines network properties, protocol properties, and content properties into a similarity value for each transformed endpoint. The comparison of any two similarity values yields a similarity metric. In one embodiment, each of the results of the similarity calculations are given equal weight in making the determination of whether the pair of connectivity vectors are similar. In other embodiments, weights can be assigned to each of the similarity calculations. In other embodiments, the determination of whether the pair of connectivity vectors are similar is based on one, two or all of the individual similarity calculations having been found to be similar.

Figure 16:
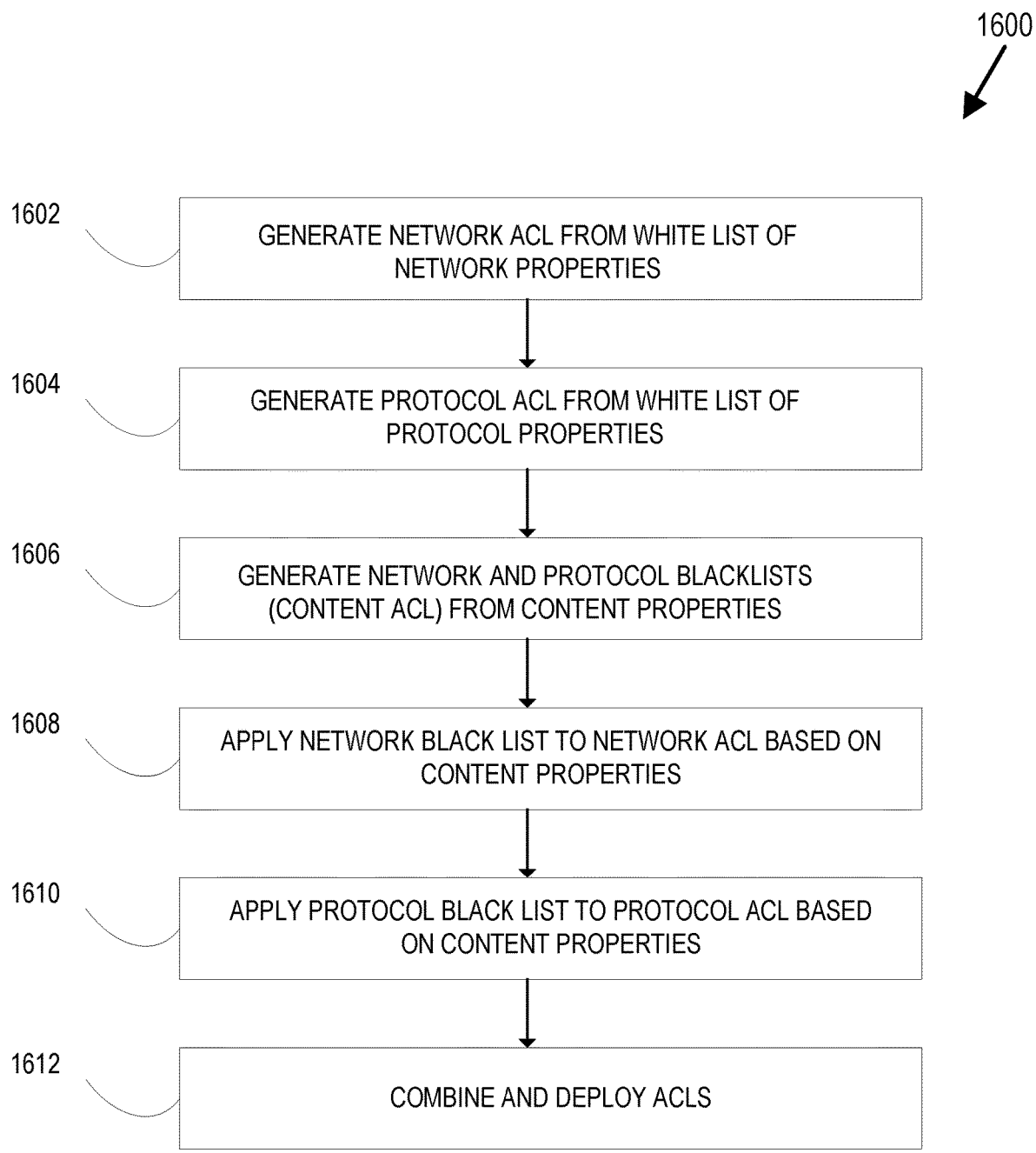
FIG. 16 is a flow diagram illustrating a process for generating and deploying a transformed endpoint access control list (ACL) within the networked environment in accordance with an embodiment.

FIG. 16 is a flow diagram illustrating a process for generating and deploying a transformed endpoint access control list (ACL) within the networked environment in accordance with an embodiment. For ease of understanding, the description of FIG. 16 below references components of the networked environment of FIG. 1, however, it is not limited to those components. In one embodiment, the actions below are performed using a security orchestrator (e.g., 124 in FIG. 1). Further, the actions below may be performed by one or more security microservices and/or one or more interface microservices. As such, a single security microservice may perform an action, or two more security services may perform the action either independently, or in conjunction. At block 1602, security orchestrator 124 generates a network ACL using the network properties for the transformed endpoint obtained from the connectivity vector for the transformed endpoint. For example, assuming that only the network properties from the connectivity vector are allowed, the network ACL is generated as a whitelist of network properties. Similarly, at block 1604, security orchestrator 124 generates a protocol ACL using the protocol properties for the transformed endpoint obtained from the connectivity vector for the transformed endpoint. For example, assuming that only the protocol properties from the connectivity vector are allowed, the protocol ACL is generated as a whitelist of protocol properties.

At block 1606, security orchestrator 124 generates a content using the content properties for the transformed endpoint obtained from the connectivity vector for the transformed endpoint. In one embodiment, the content ACL comprises network and protocol blacklists that are generated from the content properties for the transformed endpoint. For example, if the content properties indicate social security number data is sent to and/or from the transformed endpoint, only network traffic using secure shell (SSH) protocols is allowed and all other network traffic not using SSH are blocked or refused.

At block 1608, security orchestrator 124 applies the network blacklist generated based on the content properties to the network ACL. At block 1610, security orchestrator 124 applies the protocol blacklist generated based on the content properties to the protocol ACL. At block 1612, security orchestrator 124 combines and deploys the network ACL and protocol ACL to the transformed endpoints.

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 17:
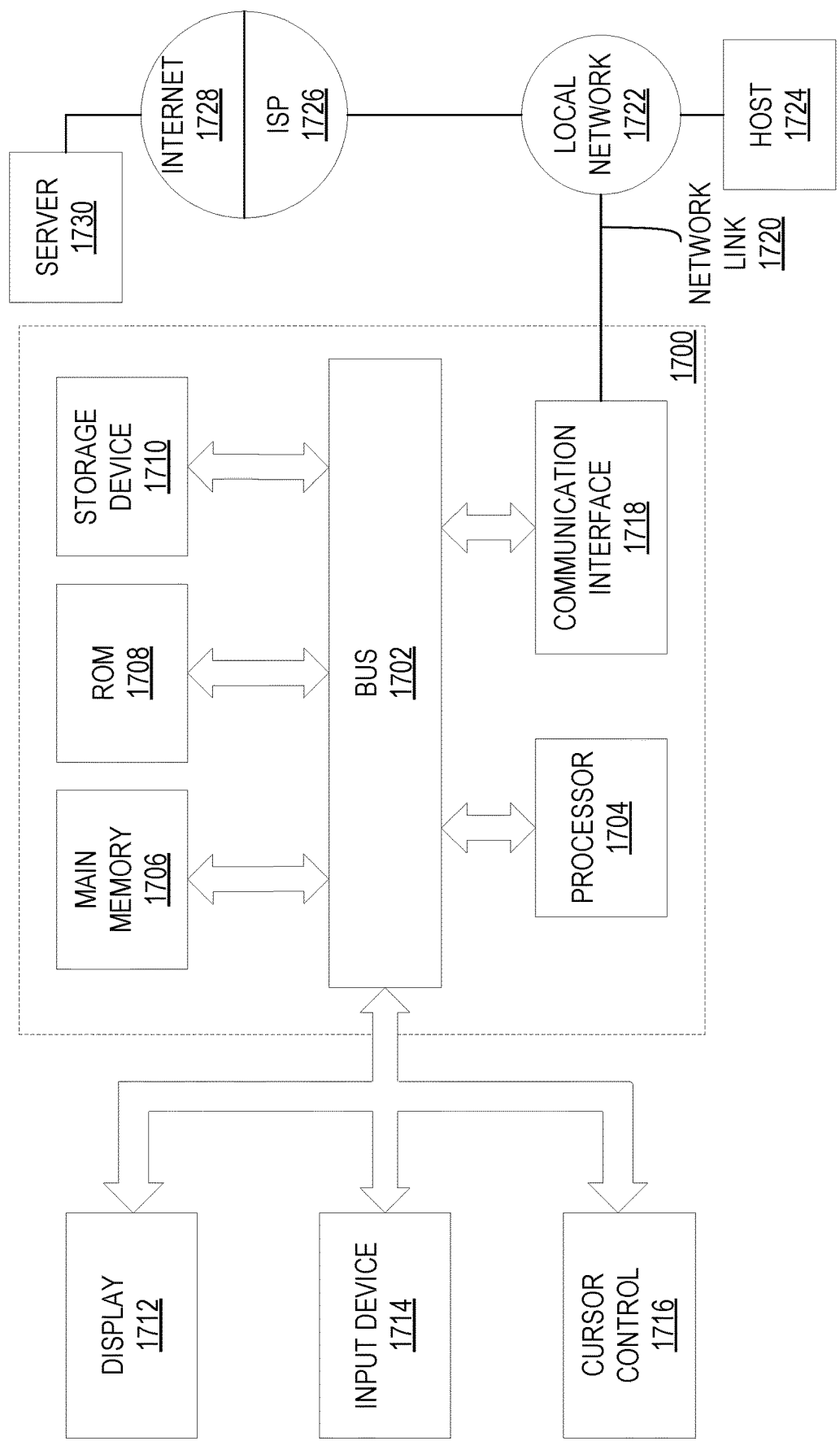
FIG. 17 is a block diagram that illustrates a computer system utilized in implementing the above-described techniques in accordance with some of the disclosed embodiments.

FIG. 17 is a block diagram that illustrates a computer system 1700 utilized in implementing the above-described techniques in accordance with some of the disclosed embodiments. Computer system 1700 may be, for example, a desktop computing device, laptop computing device, tablet, smartphone, server appliance, computing mainframe, multimedia device, handheld device, networking apparatus, or any other suitable device.

Computer system 1700 includes one or more buses 1702 or other communication mechanism for communicating information, and one or more hardware processors 1704 coupled with buses 1702 for processing information. Hardware processors 1704 may be, for example, general purpose microprocessors. Buses 1702 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1700 also includes a main memory 1706, such as a random access memory (RAM) or other dynamic or volatile storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, render computer system 1700 a special-purpose machine that is customized to perform the operations specified in the instructions.

Computer system 1700 further includes one or more read only memories (ROM) 1708 or other static storage devices coupled to bus 1702 for storing static information and instructions for processor 1704. One or more storage devices 1710, such as a solid-state drive (SSD), magnetic disk, optical disk, or other suitable non-volatile storage device, is provided and coupled to bus 1702 for storing information and instructions.

Computer system 1700 may be coupled via bus 1702 to one or more displays 1712 for presenting information to a computer user. For instance, computer system 1700 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1712 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1712.

One or more input devices 1714 are coupled to bus 1702 for communicating information and command selections to processor 1704. One example of an input device 1714 is a keyboard, including alphanumeric and other keys. Another type of user input device 1714 is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane. Yet other examples of suitable input devices 1714 include a touch-screen panel affixed to a display 1712, cameras, microphones, accelerometers, motion detectors, and/or other sensors. In an embodiment, a network-based input device 1714 may be utilized. In such an embodiment, user input and/or other information or commands may be relayed via routers and/or switches on a Local Area Network (LAN) or other suitable shared network, or via a peer-to-peer network, from the input device 1714 to a network link 1720 on the computer system 1700.

A computer system 1700 may implement techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1710. Volatile media includes dynamic memory, such as main memory 1706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1700 can receive the data on the network and demodulate the signal to decode the transmitted instructions. Appropriate circuitry can then place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

A computer system 1700 may also include, in an embodiment, one or more communication interfaces 1718 coupled to bus 1702. A communication interface 1718 provides a data communication coupling, typically two-way, to a network link 1720 that is connected to a local network 1722. For example, a communication interface 1718 may be an integrated services digital network (ISDN) card, cable modem, satellite modem, or a modem to provide a data communication connection to a corresponding type of telephone line. As another example, the one or more communication interfaces 1718 may include a local area network (LAN) card to provide a data communication connection to a compatible LAN. As yet another example, the one or more communication interfaces 1718 may include a wireless network interface controller, such as an 802.11-based controller, Bluetooth controller, Long Term Evolution (LTE) modem, and/or other types of wireless interfaces. In any such implementation, communication interface 1718 sends and receives electrical, electromagnetic, or optical signals that carry digital data streams representing various types of information.

Network link 1720 typically provides data communication through one or more networks to other data devices. For example, network link 1720 may provide a connection through local network 1722 to a host computer 1724 or to data equipment operated by a Service Provider 1726. Service Provider 1726, which may for example be an Internet Service Provider (ISP), in turn provides data communication services through a wide area network, such as the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

In an embodiment, computer system 1700 can send messages and receive data, including program code and/or other types of instructions, through the network(s), network link 1720, and communication interface 1718. In the Internet example, a server 1730 might transmit a requested code for an application program through Internet 1728, ISP 1726, local network 1722 and communication interface 1718. The received code may be executed by processor 1704 as it is received, and/or stored in storage device 1710, or other non-volatile storage for later execution. As another example, information received via a network link 1720 may be interpreted and/or processed by a software component of the computer system 1700, such as a web browser, application, or server, which in turn issues instructions based thereon to a processor 1704, possibly via an operating system and/or other intermediate layers of software components.

In an embodiment, some or all of the systems described herein may be or comprise server computer systems, including one or more computer systems 1700 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer-readable storage medium, storing software instructions, which when executed by one or more processors cause performance of any of the foregoing methods.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Examples of embodiments of methods, apparatuses, systems, etc. detailed herein are listed below.

In some embodiments, a computer-implemented method comprises: determining a set of endpoints in a network; determining transformed endpoints based on the determined set of endpoints; determining a connectivity vector for at least a first transformed endpoint and a second transformed endpoint of the transformed endpoints; deploying a security policy to the first transformed endpoint based on the connectivity vector of the first transformed endpoint; deploying the security policy to the second transformed endpoint wherein the deploying is based on a comparison of the connectivity vectors of the first and second transformed endpoints; and executing the security policy on network traffic at the first transformed endpoint and the second transformed endpoint.

In some embodiments, one or more of the following applies: 1) the method further comprises: calculating a similarity metric between the first transformed endpoint and the second transformed endpoint by comparing properties associated with the first and second transformed endpoints, wherein the similarity metric is a value indicating an amount of similarity between the first transformed endpoint and the second transformed endpoint; 2) deploying the security policy to the second transformed endpoint comprises: determining that the first transformed endpoint and the second transformed endpoint are similar based on the similarity metric; 3) the security policy is an access control list defining network traffic allowed through the first and second transformed endpoints; 4) the access control list is generated from evaluating one or more network properties, protocol properties, and content properties associated with connectivity vectors of each of the first and second transformed endpoints; and 5) determining the transformed endpoints based on the determined set of endpoints comprises: identifying two or more endpoints having one more of similar network identities and domain identities; and generating a transformed endpoint by combining two or more endpoints in response to identifying two or more endpoints have one more of similar network identities and domain identities.

In some embodiments, one or more non-transitory computer-readable storage media store instructions which, when executed by one or more hardware processors, cause performance of a method comprising: determining a set of endpoints in a network; determining transformed endpoints based on the determined set of endpoints; determining a connectivity vector for at least a first transformed endpoint and a second transformed endpoint of the transformed endpoints; deploying a security policy to the first transformed endpoint based on the connectivity vector of the first transformed endpoint; deploying the security policy to the second transformed endpoint wherein the deploying is based on a comparison of the connectivity vectors of the first and second transformed endpoints; and executing the security policy on network traffic at the first transformed endpoint and the second transformed endpoint.

In some embodiments, one or more of the following applies: 1) the method further comprises: calculating a similarity metric between the first transformed endpoint and the second transformed endpoint by comparing properties associated with the first and second transformed endpoints, wherein the similarity metric is a value indicating an amount of similarity between the first transformed endpoint and the second transformed endpoint; 2) deploying the security policy to the second transformed endpoint comprises: determining that the first transformed endpoint and the second transformed endpoint are similar based on the similarity metric; 3) the security policy is an access control list defining network traffic allowed through the first and second transformed endpoints; 4) the access control list is generated from evaluating one or more network properties, protocol properties, and content properties associated with connectivity vectors of each of the first and second transformed endpoints; and 5) determining the transformed endpoints based on the determined set of endpoints comprises: identifying two or more endpoints having one more of similar network identities and domain identities; and generating a transformed endpoint by combining two or more endpoints in response to identifying two or more endpoints have one more of similar network identities and domain identities.

In some embodiments, an apparatus comprises: one or more hardware processors; and memory coupled to the one or more hardware processors, the memory storing instructions which, when executed by the one or more hardware processors, cause the apparatus to: determine a set of endpoints in a network; determine transformed endpoints based on the determined set of endpoints; determine a connectivity vector for at least a first transformed endpoint and a second transformed endpoint of the transformed endpoints; deploy a security policy to the first transformed endpoint based on the connectivity vector of the first transformed endpoint; deploy the security policy to the second transformed endpoint wherein the deploying is based on a comparison of the connectivity vectors of the first and second transformed endpoints; and execute the security policy on network traffic at the first transformed endpoint and the second transformed endpoint.

In some embodiments, one or more of the following applies: 1) the instructions further cause the apparatus to: calculate a similarity metric between the first transformed endpoint and the second transformed endpoint by comparing properties associated with the first and second transformed endpoints, wherein the similarity metric is a value indicating an amount of similarity between the first transformed endpoint and the second transformed endpoint; 2) deploying the security policy to the second transformed endpoint comprises: determining that the first transformed endpoint and the second transformed endpoint are similar based on the similarity metric; 3) the security policy is an access control list defining network traffic allowed through the first and second transformed endpoints; 4) the access control list is generated from evaluating one or more network properties, protocol properties, and content properties associated with connectivity vectors of each of the first and second transformed endpoints; and 5) determining the transformed endpoints based on the determined set of endpoints further causes the apparatus to: identify two or more endpoints having one more of similar network identities and domain identities; and generate a transformed endpoint by combining two or more endpoints in response to identifying two or more endpoints have one more of similar network identities and domain identities.

What is claimed is:

1. A computer-implemented method comprising:
   determining a set of endpoints in a network;
   determining transformed endpoints based on the determined set of endpoints;
   determining a connectivity vector for at least a first transformed endpoint and a second transformed endpoint of the transformed endpoints, wherein the connectivity vector includes network properties, protocol properties, and content properties, and wherein the network properties, protocol properties, and content properties include data indicating a direction of transmission;
   deploying a security policy to the first transformed endpoint based on the connectivity vector of the first transformed endpoint;
   deploying the security policy to the second transformed endpoint wherein the deploying is based on a comparison of the connectivity vectors of the first and second transformed endpoints; and
   executing the security policy on network traffic at the first transformed endpoint and the second transformed endpoint.

2. The method of claim 1, further comprising:
   calculating a similarity metric between the first transformed endpoint and the second transformed endpoint by comparing properties associated with the first and second transformed endpoints, wherein the similarity metric is a value indicating an amount of similarity between the first transformed endpoint and the second transformed endpoint.

3. The method of claim 2, wherein deploying the security policy to the second transformed endpoint further comprising:
determining that the first transformed endpoint and the second transformed endpoint are similar based on the similarity metric.

4. The method of claim 1, wherein the security policy is an access control list defining network traffic allowed through the first and second transformed endpoints.

5. The method of claim 4, wherein the access control list is generated from evaluating the network properties, protocol properties, and content properties associated with connectivity vectors of each of the first and second transformed endpoints.

6. The method of claim 1, wherein determining the transformed endpoints based on the determined set of endpoints comprises:
identifying two or more endpoints having one more of similar network identities and domain identities; and
generating a transformed endpoint by combining two or more endpoints in response to identifying two or more endpoints have one more of similar network identities and domain identities.

7. One or more non-transitory computer-readable storage media storing instructions which, when executed by one or more hardware processors, cause performance of a method comprising:
determining a set of endpoints in a network;
determining transformed endpoints based on the determined set of endpoints;
determining a connectivity vector for at least a first transformed endpoint and a second transformed endpoint of the transformed endpoints, wherein the connectivity vector includes network properties, protocol properties, and content properties and wherein the network properties, protocol properties, and content properties include data indicating a direction of transmission;
deploying a security policy to the first transformed endpoint based on the connectivity vector of the first transformed endpoint;
deploying the security policy to the second transformed endpoint wherein the deploying is based on a comparison of the connectivity vectors of the first and second transformed endpoints; and
executing the security policy on network traffic at the first transformed endpoint and the second transformed endpoint.

8. The one or more non-transitory computer-readable storage media of claim 7, further comprising:
calculating a similarity metric between the first transformed endpoint and the second transformed endpoint by comparing properties associated with the first and second transformed endpoints, wherein the similarity metric is a value indicating an amount of similarity between the first transformed endpoint and the second transformed endpoint.

9. The one or more non-transitory computer-readable storage media of claim 8, wherein deploying the security policy to the second transformed endpoint further comprising:
determining that the first transformed endpoint and the second transformed endpoint are similar based on the similarity metric.

10. The one or more non-transitory computer-readable storage media of claim 7, wherein the security policy is an access control list defining network traffic allowed through the first and second transformed endpoints.

11. The one or more non-transitory computer-readable storage media of claim 10, wherein the access control list is generated from evaluating the network properties, protocol properties, and content properties associated with connectivity vectors of each of the first and second transformed endpoints.

12. The one or more non-transitory computer-readable storage media of claim 7, wherein determining the transformed endpoints based on the determined set of endpoints comprises:
identifying two or more endpoints having one more of similar network identities and domain identities; and
generating a transformed endpoint by combining two or more endpoints in response to identifying two or more endpoints have one more of similar network identities and domain identities.

13. An apparatus, comprising:
one or more hardware processors;
memory coupled to the one or more hardware processors, the memory storing instructions which, when executed by the one or more hardware processors, causes the apparatus to:
determine a set of endpoints in a network;
determine transformed endpoints based on the determined set of endpoints;
determine a connectivity vector for at least a first transformed endpoint and a second transformed endpoint of the transformed endpoints, wherein the connectivity vector includes network properties, protocol properties, and content properties, and wherein the network properties, protocol properties, and content properties include data indicating a direction of transmission;
deploy a security policy to the first transformed endpoint based on the connectivity vector of the first transformed endpoint;
deploy the security policy to the second transformed endpoint wherein the security policy is deployed based on a comparison of the connectivity vectors of the first and second transformed endpoints; and
execute the security policy on network traffic at the first transformed endpoint and the second transformed endpoint.

14. The apparatus of claim 13, wherein the instructions further cause the apparatus to:
calculate a similarity metric between the first transformed endpoint and the second transformed endpoint by comparing properties associated with the first and second transformed endpoints, wherein the similarity metric is a value indicating an amount of similarity between the first transformed endpoint and the second transformed endpoint.

15. The apparatus of claim 14, wherein deploying the security policy to the second transformed endpoint further causes the apparatus to:
determine that the first transformed endpoint and the second transformed endpoint are similar based on the similarity metric.

16. The apparatus of claim 13, wherein the security policy is an access control list defining network traffic allowed through the first and second transformed endpoints.

17. The apparatus of claim 16, wherein the access control list is generated from evaluating the network properties, protocol properties, and content properties associated with connectivity vectors of each of the first and second transformed endpoints.

18. The apparatus of claim 13, wherein determining the transformed endpoints based on the determined set of endpoints further causes the apparatus to:
identify two or more endpoints having one more of similar network identities and domain identities; and
generate a transformed endpoint by combining two or more endpoints in response to identifying two or more endpoints have one more of similar network identities and domain identities.

* * * * *